(12) United States Patent
Ding et al.

(10) Patent No.: US 11,746,393 B2
(45) Date of Patent: Sep. 5, 2023

(54) METALLIC COMPONENTS WITH ENHANCED MECHANICAL STRENGTH THROUGH SURFACE MECHANICAL GRINDING

(71) Applicant: Purdue Research Foundation, West Lafayette, IN (US)

(72) Inventors: Jie Ding, Liaoning (CN); Qiang Li, Ames, IA (US); Zhongxia Shang, Lafayette, IN (US); Xinghang Zhang, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 0 days.

(21) Appl. No.: 17/730,557

(22) Filed: Apr. 27, 2022

(65) Prior Publication Data

US 2022/0251674 A1 Aug. 11, 2022

Related U.S. Application Data

(62) Division of application No. 16/774,925, filed on Jan. 28, 2020, now Pat. No. 11,319,606.

(60) Provisional application No. 62/798,544, filed on Jan. 30, 2019.

(51) Int. Cl.
    *C21D 7/08* (2006.01)
    *B24B 1/00* (2006.01)
    *B23D 61/02* (2006.01)

(52) U.S. Cl.
    CPC .............. *C21D 7/08* (2013.01); *B23D 61/026* (2013.01); *B24B 1/00* (2013.01)

(58) Field of Classification Search
    CPC .......... C21D 7/08; B23D 61/026; B24B 1/00; B24B 53/00; B24B 49/18
    See application file for complete search history.

(56) References Cited

U.S. PATENT DOCUMENTS 4,535,571 A * 8/1985 Smith ..................... B24B 53/00
                                                            451/21
2021/0147991 A1* 5/2021 Lu ............................ C25C 7/06

FOREIGN PATENT DOCUMENTS

CN          105177645 A   * 12/2015

* cited by examiner

*Primary Examiner* — Lee A Holly
(74) *Attorney, Agent, or Firm* — Purdue Research Foundation

(57) ABSTRACT

A method of strengthening a component made of a metallic material. The method includes subjecting the component to a mechanical grinding process incorporating a relative motion between a tool and the component forming a gradient structure on the surface of the component, resulting in increased tensile strength of the component. A method of strengthening a component made of a TWIP steel. The method includes subjecting the component made of TWIP steel to a mechanical grinding process incorporating a relative motion between a tool and the component forming a gradient structure containing a surface nanolaminate layer, a shear band layer, and an inner deformation twinned layer, resulting in increased tensile strength of the component. A component made of a TWIP steel containing a gradient structure with a surface nanolaminate layer, a shear band layer, and a deformation twinned layer.

8 Claims, 26 Drawing Sheets

METALLIC COMPONENTS WITH ENHANCED MECHANICAL STRENGTH THROUGH SURFACE MECHANICAL GRINDING

CROSS-REFERENCE TO RELATED APPLICATIONS

The present U.S. patent application is a divisional of U.S. patent application Ser. No. 16/774,925 filed Jan. 28, 2020, which is related to and claims the priority benefit of U.S. Provisional Patent Application Ser. No. 62/798,544 filed Jan. 30, 2019, the contents of which are hereby incorporated by reference in their entirety into the present disclosure.

STATEMENT REGARDING GOVERNMENT FUNDING

This invention was made with government support under DE-NE0008549 awarded by the Department of Energy. The government has certain rights in the invention.

TECHNICAL FIELD

The present disclosure generally relates to enhancing mechanical properties of materials, especially steel, through deformation treatments, especially surface mechanical grinding.

BACKGROUND

This section introduces aspects that may help facilitate a better understanding of the disclosure. Accordingly, these statements are to be read in this light and are not to be understood as admissions about what is or is not prior art.

Making metallic materials stronger without sacrificing the ductility has always been an issue for materials science. Severe plastic deformation (SPD) has been proven to be an effective way for metallic materials strengthening, but the ductility is usually compromised. Such dilemma has been addressed recently by tailoring the microstructure of metals in nanoscale, including bimodal or multi-modal grain size distribution design and high density of growth nanotwins etc.

Recently, another strategy by introducing gradient structure into metals surface has drawn increasing interests due to the excellent synergy strength and ductility it produced. Gradient structure, for the purposes of this disclosure and as is generally understood, refers to a microstructure at and near the surface of a material or a component wherein there is a gradation or gradual change in the size of the grains from the surface into the material or the component. Gradient structured (GS) material usually exhibits a gradual evolution of microstructure from surface to the core and it generally contains several layers according to the grain size. Several surface severe plastic deformation techniques have been proposed for the fabrication of GS metals, like surface mechanical grinding treatment (SMGT), surface mechanical attrition treatment (SMAT) etc. The microstructure evolution during plastic deformation has been extensively investigated and two types of grain refinement mechanisms have been reported. For body-centered cubic (BCC) materials like interstitial free (IF) iron and face-centered cubic (FCC) materials with high stacking faults energy (SFE) like nickel, the grain refinement process dominated by dislocation activities that include the formation of dislocation cell, and the transformation of cell walls into low angle and then high angle grain boundaries. While for FCC metals with low SFE such as stainless steel, grain refinement is dominated by deformation twinning, including twinning subdivision and twin boundary-dislocation interaction. Upon introducing gradient structure into the surface of metallic materials, a combination of high strength and ductility achieved. For example, the yield strength of GS copper fabricated by SMGT almost doubled comparing with the untreated coarse-grained counterparts without sacrificing the ductility. The GS IF steel have been strengthened several times after SMAT with a slightly decreased ductility. The studies about underlying strengthening and strain hardening mechanisms reveals that, the synergetic strengthening that attributed to the mechanical incompatibility of hard surface layer and soft inner core, and the stress gradient generated during deformation have contributed to the increase in strength. For the explanation of excellent work hardening behavior, one mechanism claims that the strain localization of surface nanograined layer can be suppressed due to deformation induced grain coarsening. There are also evidences suggest that the significant back stress strain hardening effect that caused by the pileup of geometrically necessary dislocations (GND) have contributed to the work hardening. However, a systematic investigation about the grain refinement process and corresponding mechanical behavior of GS metals is rarely seen.

The effort for the development of high-performance metallic materials have also led to the invention of several advanced steels, such as high manganese twinning-induced plasticity (TWIP) steel, well known in the industry and to those skillet in the art. TWIP steels are known for high strain hardening and high ultimate tensile stress. The ultimate strength of TWIP steel can reach as high as >1.4 GPa after more than 40% of true tensile strain. However, their yield strength is usually limited to <500 MPa. Hence, it's essential to strengthen TWIP steel without sacrificing ductility significantly.

Thus there exists an unmet need for strengthening TWIP steel without sacrificing ductility significantly.

SUMMARY

A method of strengthening a component made of a metallic material is disclosed. The method includes subjecting a component made of a metallic material to a mechanical grinding process incorporating a relative motion between a tool made of a material having hardness that is greater than that of the metallic material, and the component made of a metallic material forming a gradient structure on the surface of the component. This gradient structure formed on the surface of the component made of the metallic material, results in a tensile strength of the component being greater than the tensile strength the component made of the metallic component prior to being subjected to the mechanical girding process.

A method of strengthening a component made of a TWIP steel is disclosed. The method includes subjecting a component made of TWIP steel to a mechanical grinding process incorporating a relative motion between a tool made of a material having hardness that is greater than that of TWIP steel, and the component made of TWIP steel which forms a gradient structure. This gradient structure contains a surface nanolaminate layer, a shear band layer, and an inner deformation twinned layer, such that the component made of TWIP steel possesses a tensile strength greater than the tensile strength the component of made of TWIP steel prior to being subjected to the mechanical girding process.

A component made of a TWIP steel containing a gradient structure is disclosed. The gradient structure contains a surface nanolaminate layer, a shear band layer, and a deformation twinned layer.

BRIEF DESCRIPTION OF THE FIGURES

Some of the figures shown herein may include dimensions. Further, some of the figures shown herein may have been created from scaled drawings or from photographs that are scalable. It is understood that such dimensions or the relative scaling within a figure are by way of example, and not to be construed as limiting. It should be recognized that all the figures shown are not to scale.

DETAILED DESCRIPTION

Figure 1B:
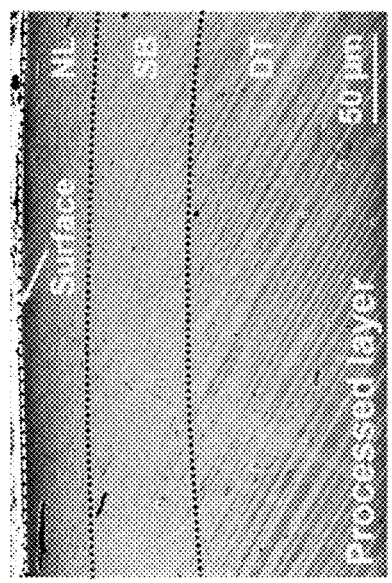
FIGS. 1A and B show SEM images of the microstructure of TWIP steel matrix, and gradient structure obtained by SMGT processing, respectively.
FIGS. 1C through 1E show SEM images of the microstructure of NL, SB and DT layers respectively of the gradient structure of TWIP steel after SMGT processing.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

This disclosure describes that gradient structured metallic materials have shown a combination of high strength and good ductility. In experiments leading to this disclosure a test samples made of TWIP steel was subjected to a mechanical grinding process of this disclosure. The test sample in one of the studies leading to this disclosure is in the form of a solid rod wherein the diameter of the rod was approximately 7 mm. In some experiments, the samples made of TWIP steel had a dog-bone shape. Thus, in this disclosure, properties of the rod-shaped and the dog-bone-shaped samples made of TWIP steel may sometimes be referred to as the properties of the TWIP steel, for convenience. This will be readily understood depending on the context by those skilled in the art. The rod made of TWIP steel with large equiaxed grains was processed by surface mechanical grinding treatment and gradient structures containing surface nanolaminated layer (NL), shear band layer (SB) and deformation twinned layers (DT) were introduced into the surface. For purposes of this disclosure, a nanolaminate layer (NL) is the outermost layer of the rod and hence forms the surface layer of the rod and is so called because this layer has nanosized lamellae. For purposes of this disclosure a shear band layer (SB) is layer just beneath the nanolaminated layer and contains high density deformation twins and shear bands created by the mechanical grinding process of this disclosure. For purposes of this disclosure, deformation twinned layer (DT) contains only high density deformation twins and this DT layer is just beneath the SB layer. TEM observation revealed that detwinning occurs during microstructural evolution during the grinding process. Tensile tests results show that the yield strength of gradient structured TWIP steel increases with processing induced shear strain and reaches a plateau where the surface layer doesn't strengthen further. The decreasing of work hardening rate with increasing number of processing passes and penetration depth indicates that an optimum gradient structure may exist to achieve the best strength-ductility combinations.

Materials and processing: The material investigated in experiments leading to this disclosure was a TWIP steel with chemical composition (in Wt. %) of Mn 19.0, Cr 4.0, Si 0.4, Ni 0.2, C 0.6, N 0.09, P 0.02, balanced by Fe. Prior to SMGT processing, the as casted steel ingot was firstly cut into a rod with diameter of 7 mm using electrical discharging machining technique. Detailed SMGT procedure can be found in a journal article titled "Mechanical behavior of structurally gradient nickel alloy" by J. Ding, Q. Li, J. Li, S. Xue, Z. Fan, H. Wang, X. Zhang published in Acta Materialia 149 (2108) 57-67. The contents of this publication are incorporated by reference in their entirety into this disclosure. For the fabrication of samples for microstructure characterization, the rod in contact with a tool (the tool is in the shape of a sphere of approximately 6 mm in diameter) made of tungsten carbide (WC), was rotated at the velocity of 450 rpm. The moving speed in the direction of the length of the rod and penetration depth of the WC tool were 15 mm/min and 20 µm, respectively. Ten (10) passes were conducted in total to increase the shear strain in the rod. In some experiments samples for SMGT processing were made of TWIP steel in a dog-bone shape were employed. For the preparation of these dog-bone specimens for tensile tests, rods (7 mm in diameter) made of TWIP steel were firstly machined into dog-bone shape and then followed by SMGT on the gauge (central cylindrical) part of the dog bone sample) area. The gauge area has a dimeter of slightly larger than 3 mm (smaller than the 7 mm diameter of the rod above). The SMGT rotation speed was adjusted according to the diameter of the gauge area to ensure a shearing speed same as the one employed for the 7 mm-diameter rod. For example, in one experiment with a dog-bone sample, the rotation speed was 300 rpm and the moving velocity of tungsten carbide tool along the length of the gauge part of the dog-bone was 15 mm/min. To investigate the impact of penetration depth and number of grinding passes on the mechanical properties of processed TWIP steel, dog-bone specimens were processed with 3, 6 and 10 passes with penetration depth of 20 µm were fabricated (denoted as specimen 20 µm/3P, 20 µm/6P and 20 µm/10P, respectively). To investigate the impact of penetration depth on the mechanical behavior of processed TWIP steel, another dog-bone specimen processed with 10 passes with a penetration depth of 35 µm (specimen 35 µm/10P) was prepared. The size of gauge area after SMGT was about 3 mm in diameter and 12 mm in length. Cooling oil was used during processing for temperature control.

Microstructure characterization: Samples for scanning electron microscopy (SEM) characterization and Vickers hardness testing were polished using 400, 800, 1200 grit sand paper, 3 µm and 1 µm diamond paste and 30 nm colloidal silica suspensions sequentially. SEM observation was performed using FEI Quanta 650 FEG SEM with operation voltage of 10 kV. Cross-section transmission electron microscopy (TEM) characterization were prepared by focus ion beam (FIB) technique using the FEI Quanta 3D FEG dual beam FIB/SEM following typical protocol. A Talos 200X TEM operating at 200 kV was used for TEM characterization. The grain orientation analysis of TEM samples was performed using the ASTAR (EBSD-TEM like automatic phase-orientation TEM mapping) setup coupled with Talos 200X TEM, and the post data analysis was conducted using OIM Analysis software.

Mechanical testing: Microhardness measurements along the depth direction of cross-sectional specimens were conducted using a LECO LM247 microhardness tester with a Vickers indenter tip. The maximum applied load was 25 g, with a holding time of 13 s. Tensile tests were performed with an MTS Insight tensile tester at a constant strain rate of $1 \times 10^{-3}$/s. Extensometer was used for accurate strain measurement.

Figure 1A:
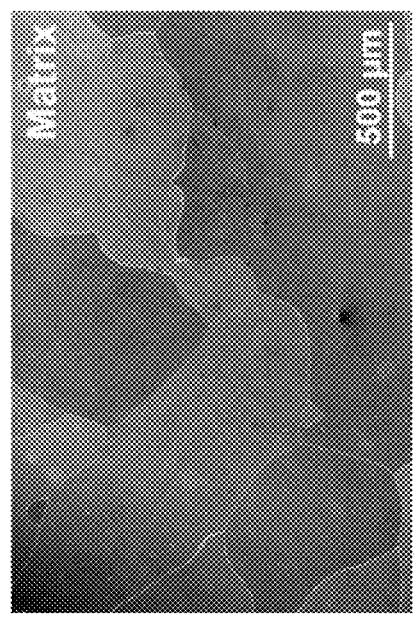
Figure 1D:
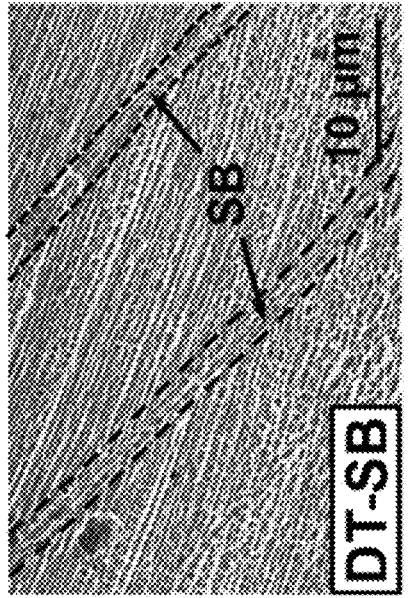
Figure 1C:
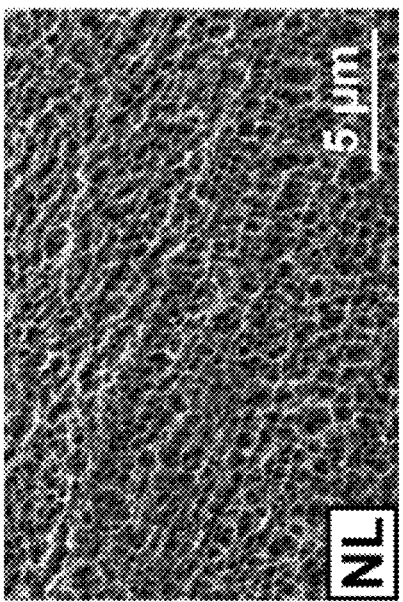
Figure 1E:
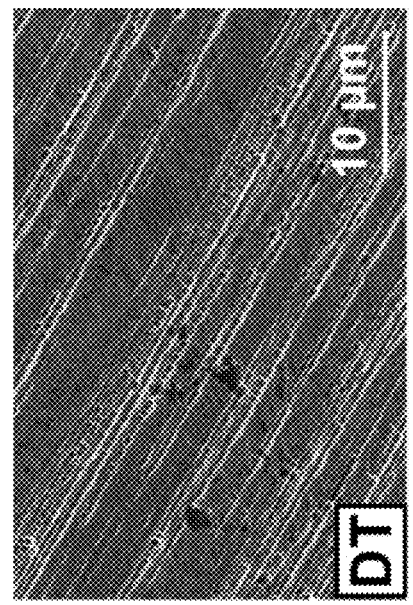

Microstructure evolution: FIGS. 1A and B show SEM images of the microstructure of TWIP steel matrix, and gradient structure obtained by SMGT processing, respectively. The SEM image of as-casted TWIP steel (FIG. 1A) shows large equiaxed grains with average grain size of several hundred micrometers. The gradient structure along depth direction formed by SMGT (FIG. 1B) can be divided into three layers according to their distinct microstructures. FIGS. 1C through 1E show SEM images of the microstructure of NL, SB and DT layers respectively of the gradient structure of TWIP steel after SMGT processing. The outmost surface layer has microstructures that are characterized by nanolaminated (NL) grains, as evidenced by FIG. 1C and TEM observation in the following section, and hence is referred to NL layer hereafter. The adjacent subsurface layer has mixture microstructure of high-density deformation twins (DT) and shear bands (SB) as identified by SEM image in FIG. 1D and TEM observations, and is denoted as SB layer. The deeper deformed region has DT/matrix microstructures FIG. 1E and is named as DT layer.

Figure 2B:
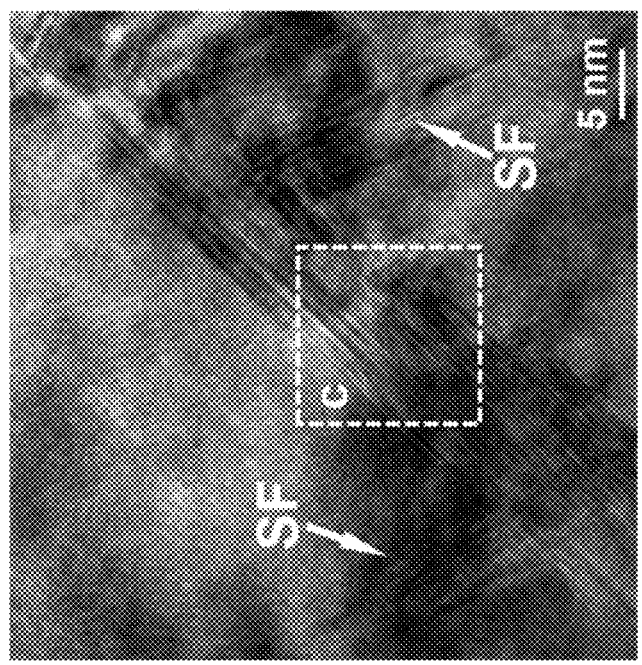
FIG. 2B shows an HRTEM image showing the microstructure of primary DT and the incident SF on another inclined (111) plane (indicated by white arrows).
Figure 2A:
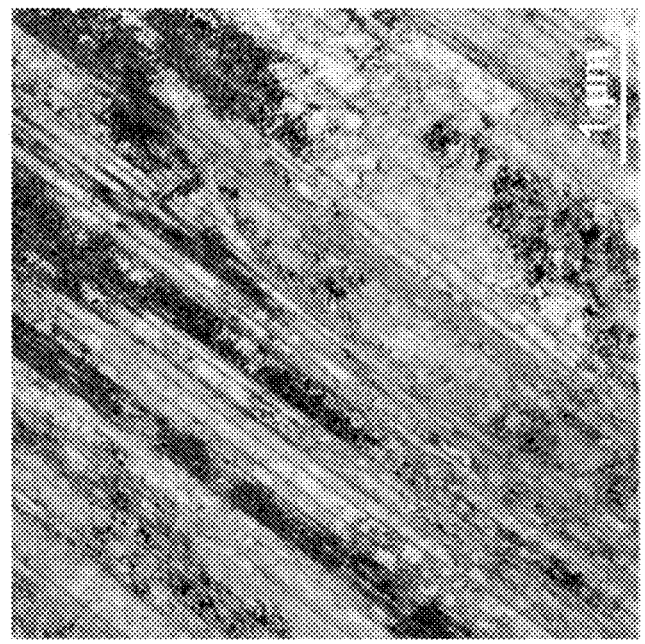
FIG. 2A shows a typical TEM image of DT layer showing a matrix/DT structure.
Figure 2D:
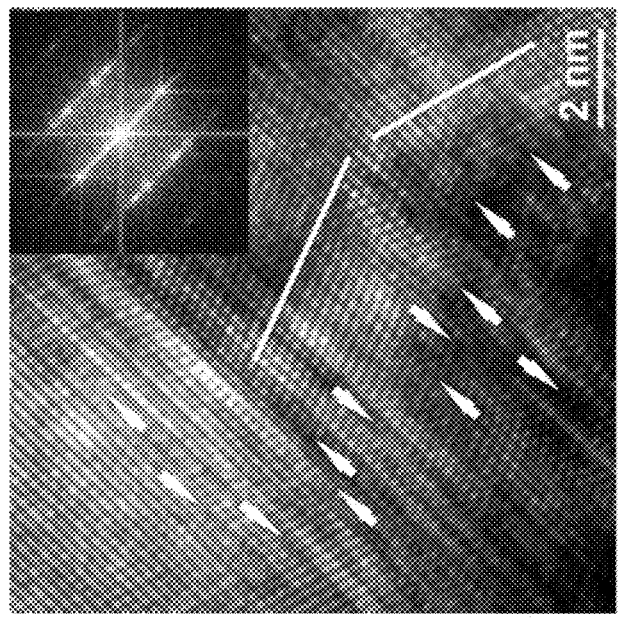
FIG. 2D shows an HRTEM image and corresponding FFT pattern showing classical DTs in the DT layer closer to the treated surface.
Figure 2C:
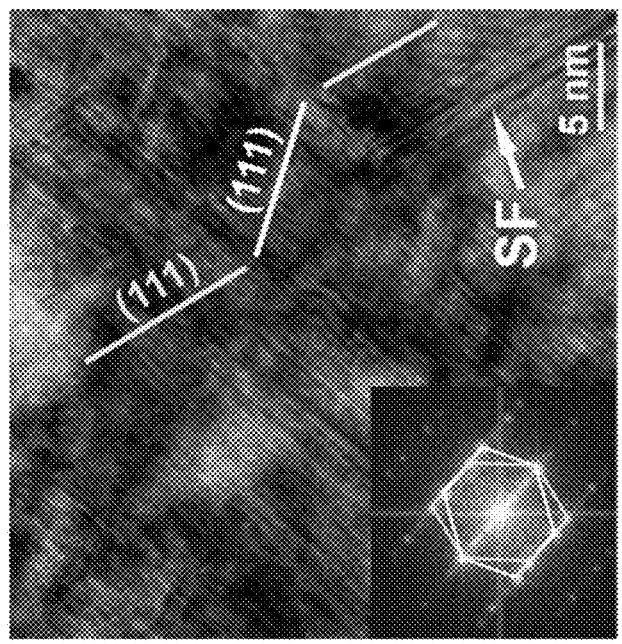
FIG. 2C shows an atomic-resolution TEM image and corresponding FFT pattern of the box c in FIG. 2B showing twin boundaries decorated by a high-density of SFs.
Figures 2E, 2F:
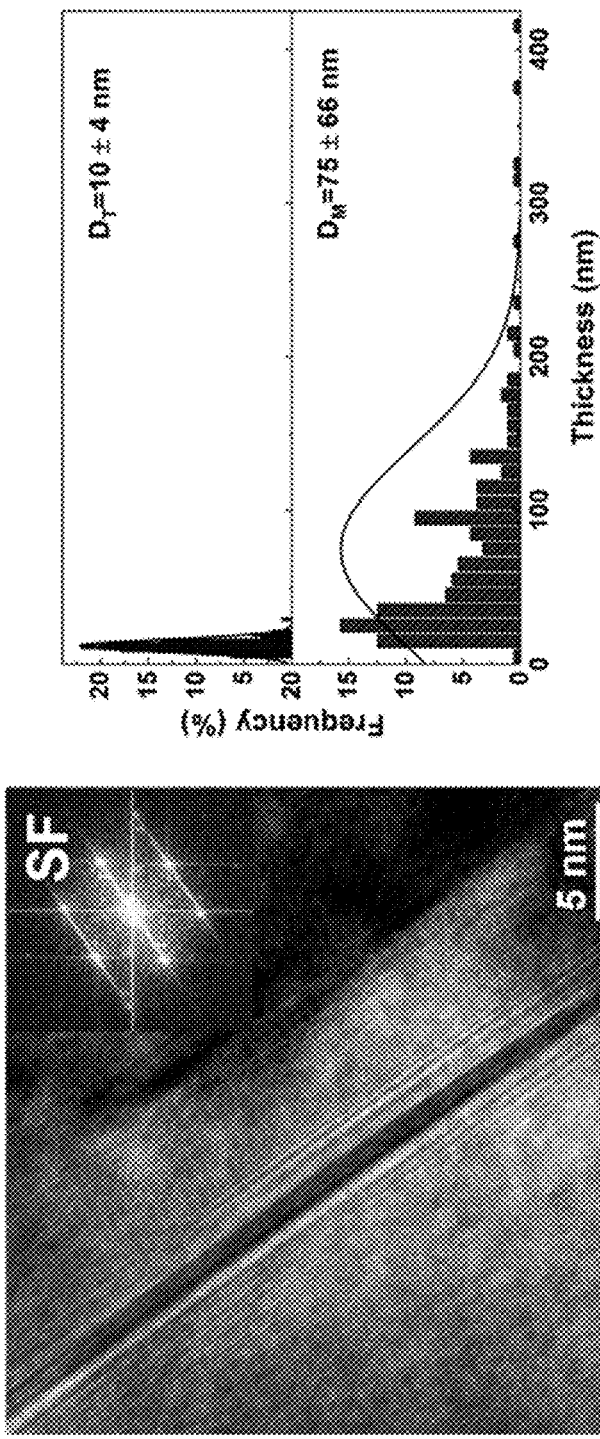
FIG. 2E is an HRTEM image and corresponding FFT pattern showing the SFs/nanotwins on another inclined (111) plane.
FIG. 2F shows the histogram of the thickness distribution of twin and matrix in the DT layer.

Microstructure of DT layer: FIG. 2A shows the microstructures of DT layer showing the DT/matrix structures. All DTs are aligned along one direction. Referring to FIG. 2B, typical DT with thickness of several nanometers of this layer is shown in a high resolution TEM (HRTEM) image. The incident stacking faults (SF) ribbons (as the white arrow indicates) along another (111) plane that inclined with the primary DT direction are also observed. The corresponding atomic-resolution TEM micrograph in FIG. 2C shows that twin boundary (shown in box c in FIG. 2B) is decorated by high-density SFs indicated by white arrows, implying that twin-dislocation interaction could have taken place during SMGT. The insert in FIG. 2C is the corresponding Fast Fourier Transform (FFT) pattern, thereby also confirming the DT microstructure and SFs. In the region of DT layer that closer to treated surface, where higher strain and strain rate has been imposed, a more classical twin structure is observed as shown in FIG. 2D, as identified by the inserted FFT pattern. The atomic-resolution TEM image and corresponding FFT pattern of SF or nanotwins along another (111) plane is shown in FIG. 2E. The histograms of the thickness distribution of DT and matrix shown in FIG. 2F reveal that the average twin thickness is around 10 nm, and the undeformed matrix has a wide size distribution from 10 nm to 420 nm and an average size of ~75 nm.

Figure 3A:
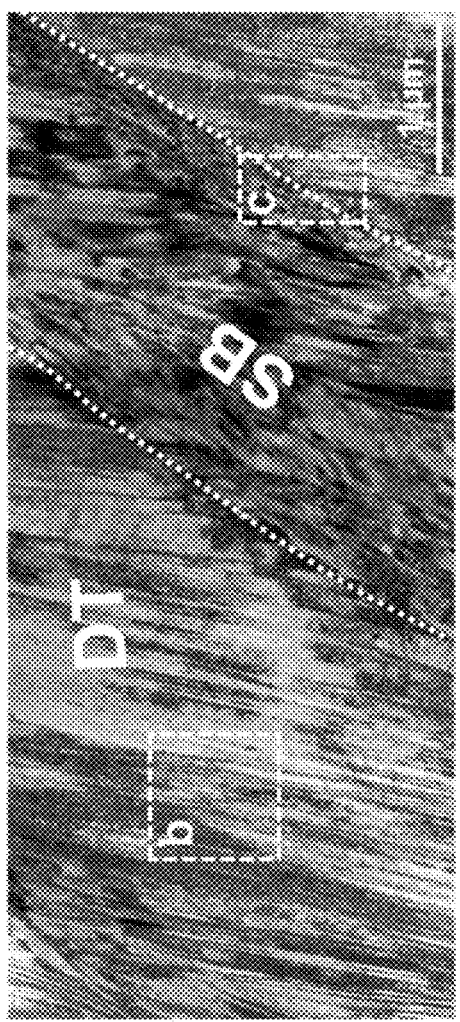
FIG. 3A shows typical TEM image of the SB layer showing the co-existence of DTs and SBs.
Figure 3C:
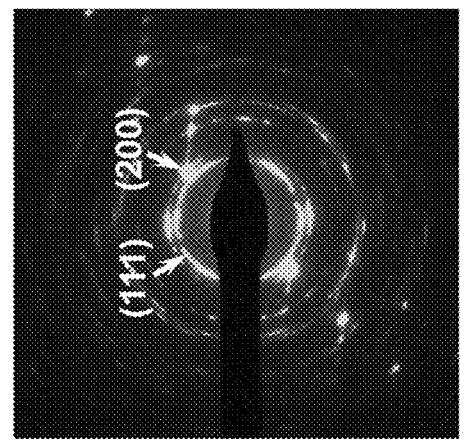
FIG. 3B and show 3C show SAD pattern of the DT (box b of FIG. 3A) and (c) SB region (box c of FIG. 3A).
FIG. 3D shows HRTEM image of the typical DT structures in the SB layer.
FIG. 3E shows ASTAR orientation map analysis results of the SB in box c.
FIG. 3F shows the histogram of the thickness distribution of twin and matrix lamellae in the SB layer.
Figure 3B:
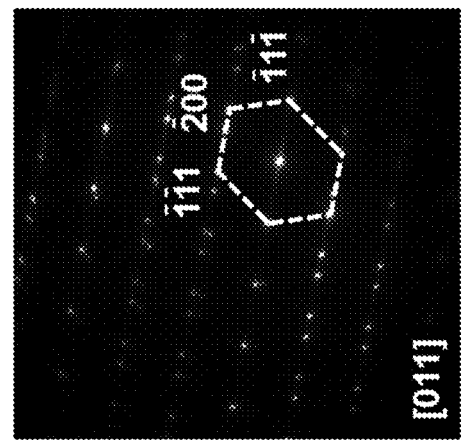
Figure 3D:
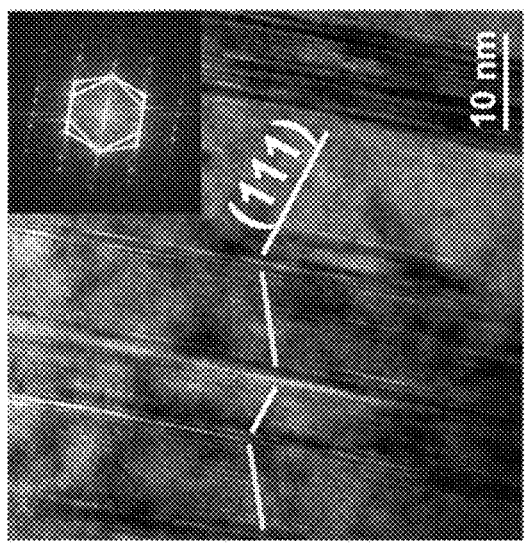
Figure 3E:
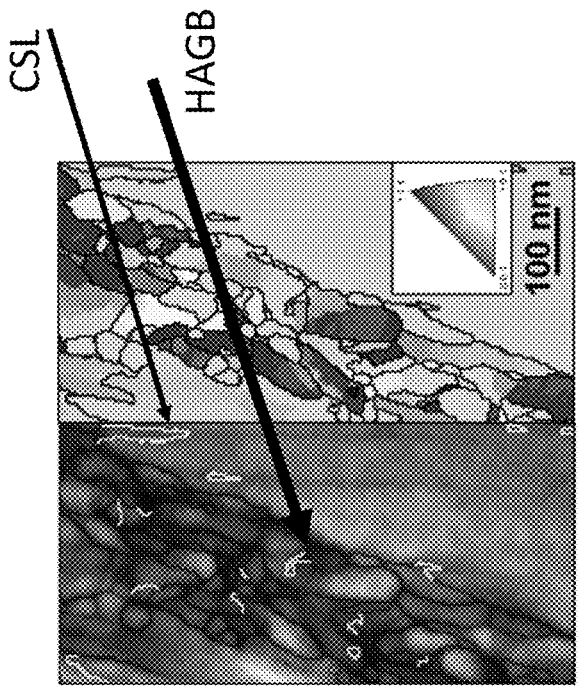
Figure 3F:
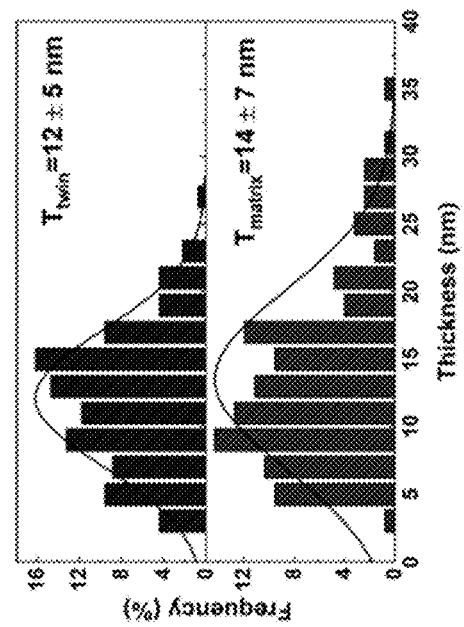

Microstructure of SB layer: Higher level of both strain and strain rate have been introduced in the SB layer during SMGT, which resulted in the formation of mixture structure of high-density DTs and SBs. FIG. 3A shows the typical microstructure of this layer where SB is denoted by white dotted lines. Similar structure containing DTs and SBs have also been observed in other works on severely deformed alloys. FIG. 3B shows selected area diffraction (SAD) pattern taken from white dashed box b area in FIG. 3A, confirming the formation of DT structure. FIG. 3C shows SAD pattern taken from box c area in FIG. 3A, revealing the classical diffraction ring of nanograins in SB. FIG. 3D shows the HRTEM image of DT structure with white lines tracing the {111} planes forming the twin relationship. The insert is the corresponding FFT pattern that confirming the DT microstructure. The ASTAR orientation map analysis results of area c in FIG. 3A are shown in FIG. 3E. The grain boundaries characteristic map on the left reveals that majority of grain boundaries of nanograins in the SB are high angle grain boundaries (HAGB), which is indicated by dark lines. The proportion of low angle grain boundaries (LAGB) and coincidence site lattice (CSL) boundaries is very low. The corresponding reverse pole figure image on the right side reveals that grain orientations in the SB are close to [111] lattice direction, while that of the adjacent DT region are close to [101] direction, indicating severe shear deformation during SMGT. The thickness distribution charts of twin and matrix lamella of SB layer in FIG. 3F show that the average twin thickness is ~12 nm, comparable with that of DTs in the DT layer. While the average lamella thickness of matrix is reduced to ~14 nm with much smaller distribution range. In practice, it is hard to distinguish between the twins and matrix in FIG. 3A because of their similar thickness, which implies that the whole grain has been transformed to twin structure.

Figure 4B:
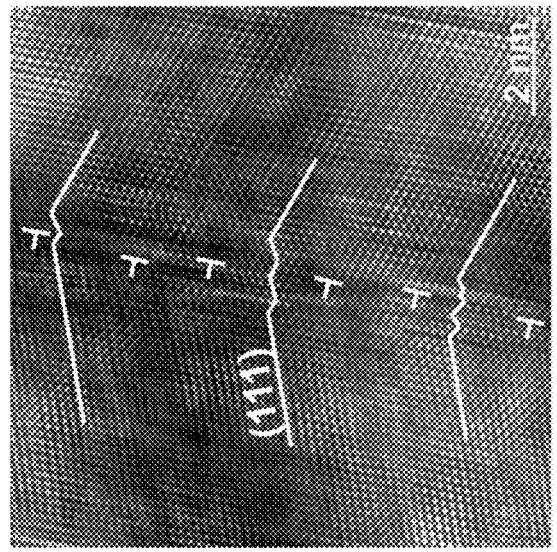
FIG. 4B shows the Fourier filtered image of the area enclosed by box b in FIG. 4A
Figure 4A:
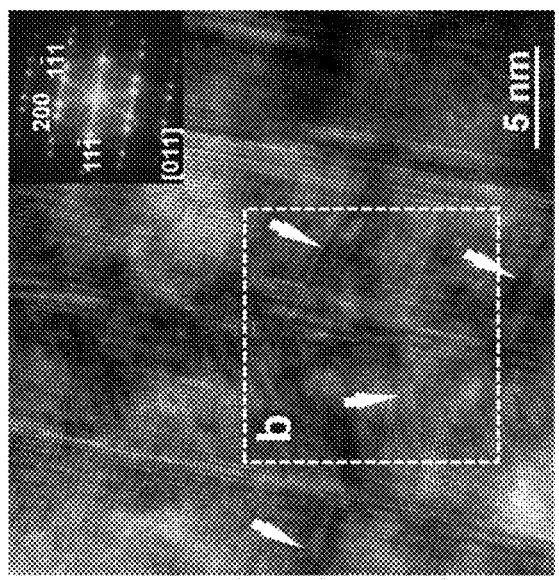
FIG. 4A shows an atomic-resolution TEM image showing detwinning resulted from inclined SFs where white arrows mark several SFs.
Figure 4C:
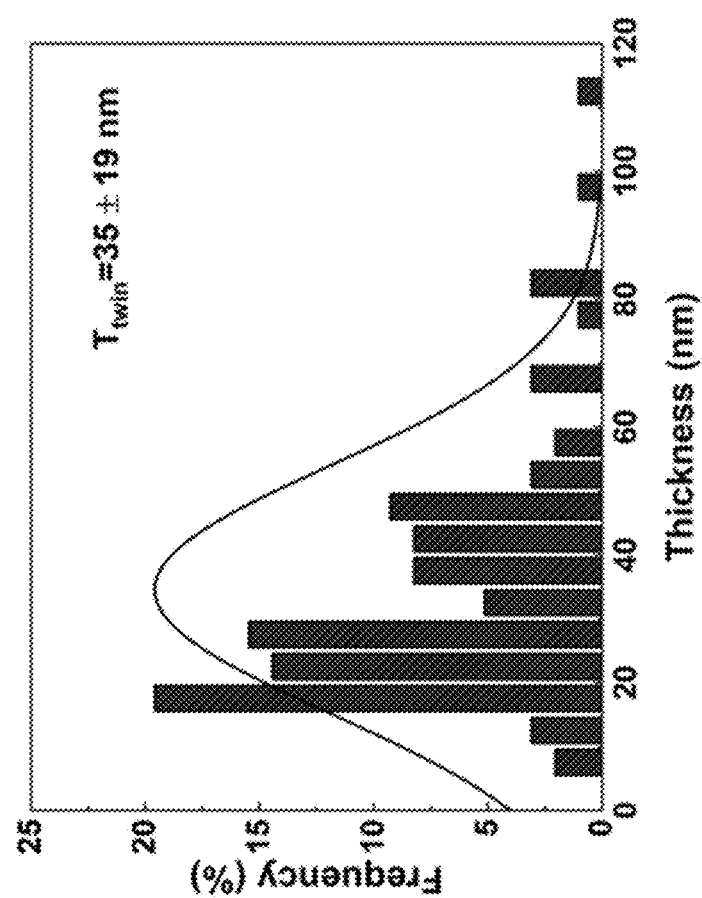
FIG. 4C shows the statistical study of twin spacing after detwinning.

It is believed that high-density inclined SFs and their interaction with the primary twin boundaries in SB layer will results in detwinning phenomenon. An atomic-resolution TEM image in FIG. 4A shows a distorted twin boundary that react with several inclined SFs (indicated by white arrows). The inserted FFT pattern also confirms the mixture structure of DT and SFs. The Fourier filtered image obtained from the area enclosed by white dashed box b in FIG. 4A is shown in FIG. 4B, where black lines indicate {111} planes that form twin relationship. It clearly shows that the area surrounding the original twin boundary was severely distorted by the formation of multiple SFs, as indicated by the black zigzag lines. The movement of partial dislocations that coupled with inclined SFs shift the primary DT boundaries and eventually leads to detwinning. A detailed description about the interaction of inclined SFs with twin boundary leading to detwinning can be found elsewhere in the literature. Similar detwinning process were frequently observed in other severely deformed alloys. The statistic thickness distribution of DT thickness in the area that close to surface NL layer in FIG. 4C reveals that average thickness is ~35 nm, much thicker than that in the deeper region (12 nm), which also verified the detwinning process.

Figure 5B:
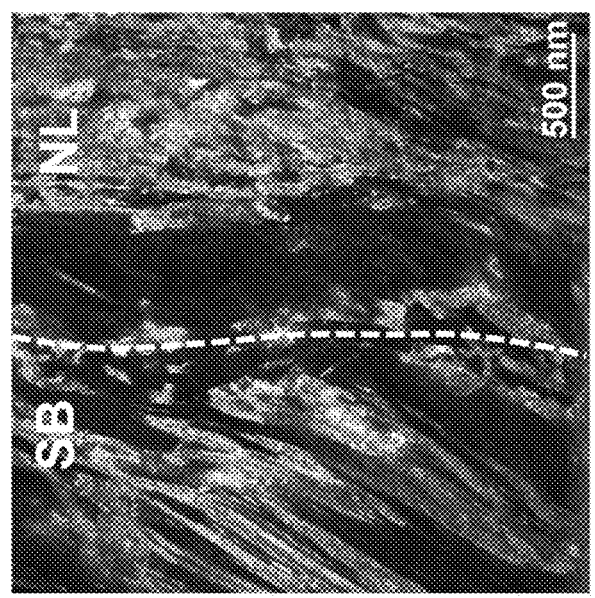
FIGS. 5A and 5B show bright and dark field TEM images respectively of the interface between SB and NL layer, ~38 μm away from the SMGT treated top surface.
Figure 5A:
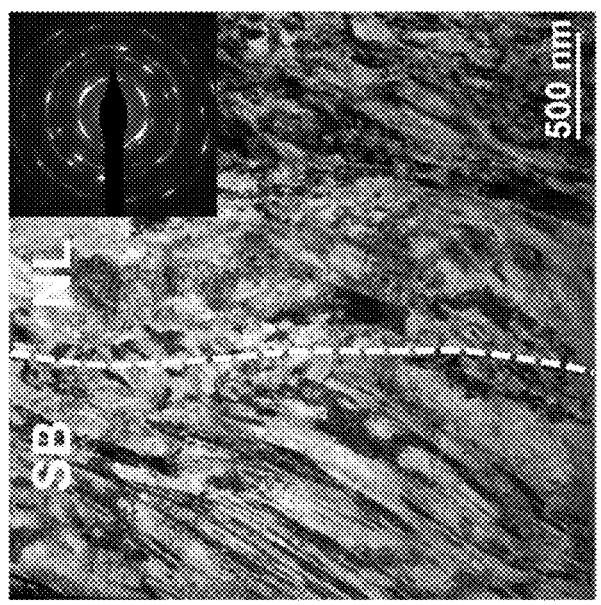
Figure 5C:
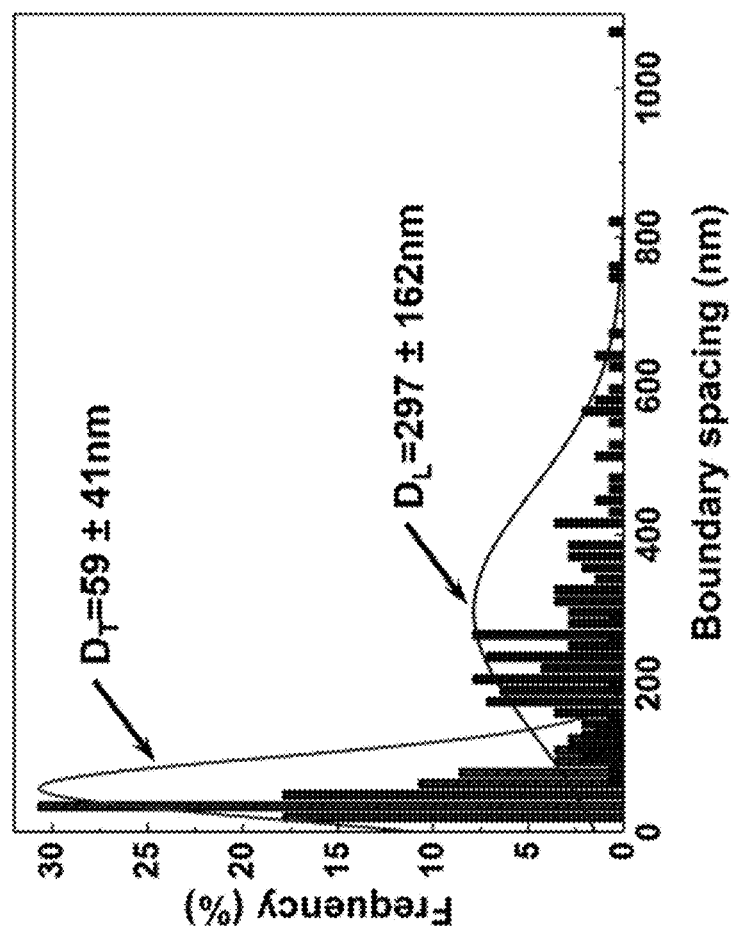
FIG. 5C shows statistical distribution of lamellae thickness ($D_T$) and lamellae length ($D_L$) of NL layer ~38 μm away from the SMGT treated top surface.
Figure 5E:
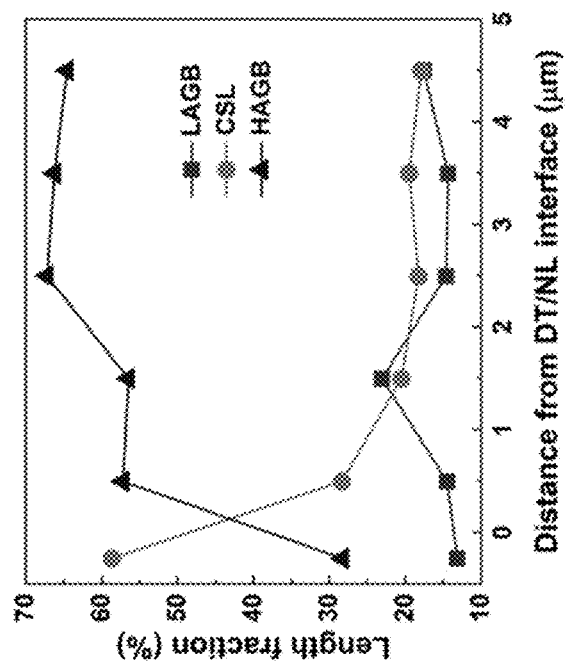
FIG. 5E shows variation of the fraction of low angle grain boundary (LAGB), coincidence site lattice (CSL) boundary and high angle grain boundary (HAGB) in the SB/NL interface region.
Figure 5D:
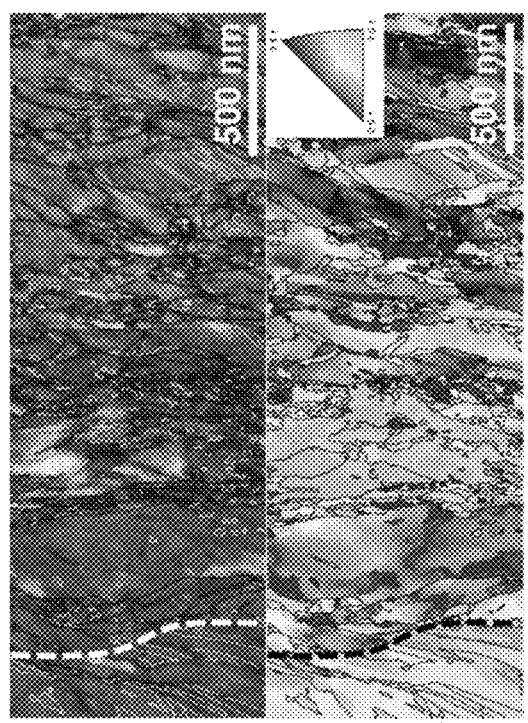
FIG. 5D shows ASTAR orientation map analysis of the SB/NL interface region.

Microstructure of NL layer: With further increasing of strain and strain rate, lamellar structures formed on the surface NL layer. TEM images in FIGS. 5A and 5B show the transformation of twin to nano lamellae in the DT/NL interface area, ~38 μm from the treated surface. They reveal that a sharp interface rather than a gradually transition zone formed between these two layers. The spacing of laminate boundaries ($D_T$) of NL layer spans from a few (about 5 to 10) to 100 nm (averaging about 59 nm) and their length ($D_L$) ranges from 60 to 1100 nm (averaging about 297 nm), as shown in FIG. 5C. The ASTAR orientation map analysis results of SB/NL interface area are shown in FIG. 5D. The grain boundaries characteristic map on the top reveals that almost all CSL boundaries (white lines) transformed to HAGBs (dark lines) instantly after cross the interface (as indicated by dash line). The corresponding reverse pole figure image on the bottom also verified the shift of grain orientation from [101] direction in SB region to [111] direction in NL region, which indicates a severe strain during processing. The variation of length fraction of LAGB, CSL boundary and HAGB cross the SB/NL interface region discloses that CSL boundary dominates in the SB side. While HAGB dominates immediately after cross the DT/NL interface, and the fraction of CSL decreases to lower than 20% just 1.5 μm away from the interface, which implies that a critical strain level may exist that triggering the transformation from CSL boundary to HAGB.

Figure 6B:
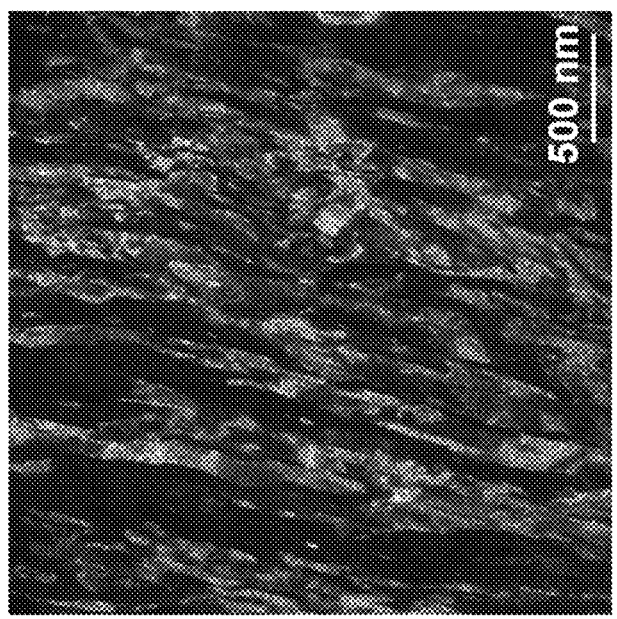
FIGS. 6A and 6B shows bright and dark field TEM images, respectively, of the laminated structure of NL layer at the depth of ~25 μm from the treated surface.
Figure 6A:
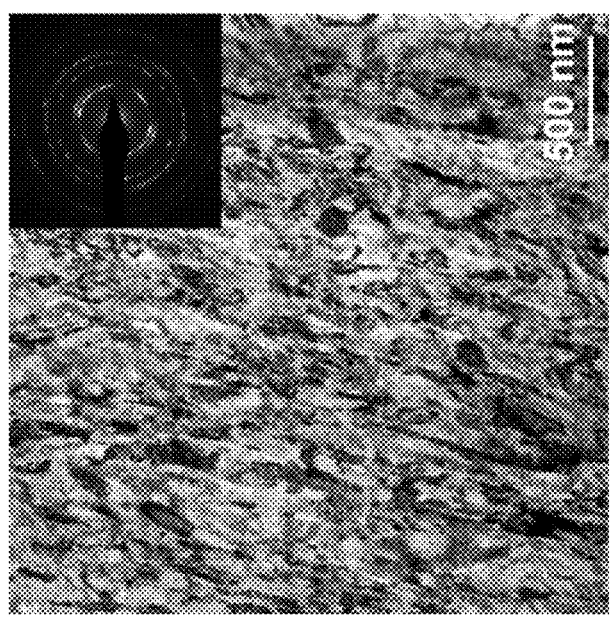
Figure 6D:
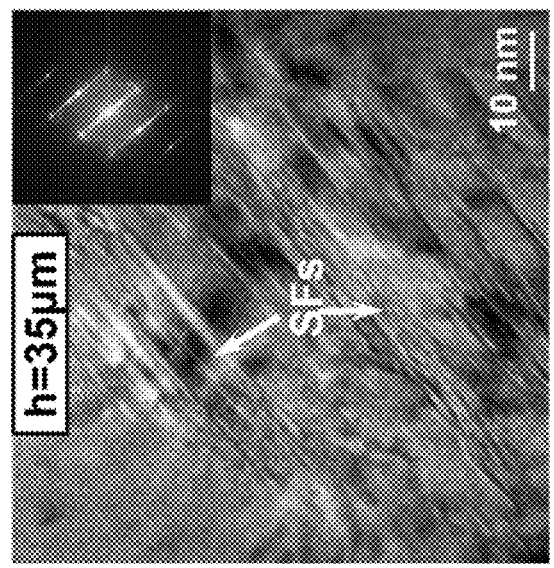
FIGS. 6D and 6E show HRTEM image of the evolution of SFs/nanotwins inside the lamellae over the depth of ~35 μm and ~25 μm from the surface.
Figure 6C:
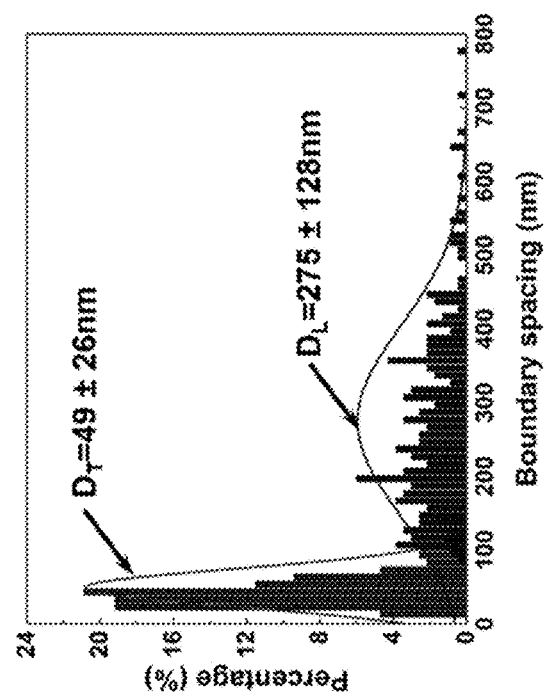
FIG. 6C shows statistical distribution of lamellae thickness ($D_T$) and length ($D_L$) at the depth of ~25 μm from the treated surface.
Figure 6F:
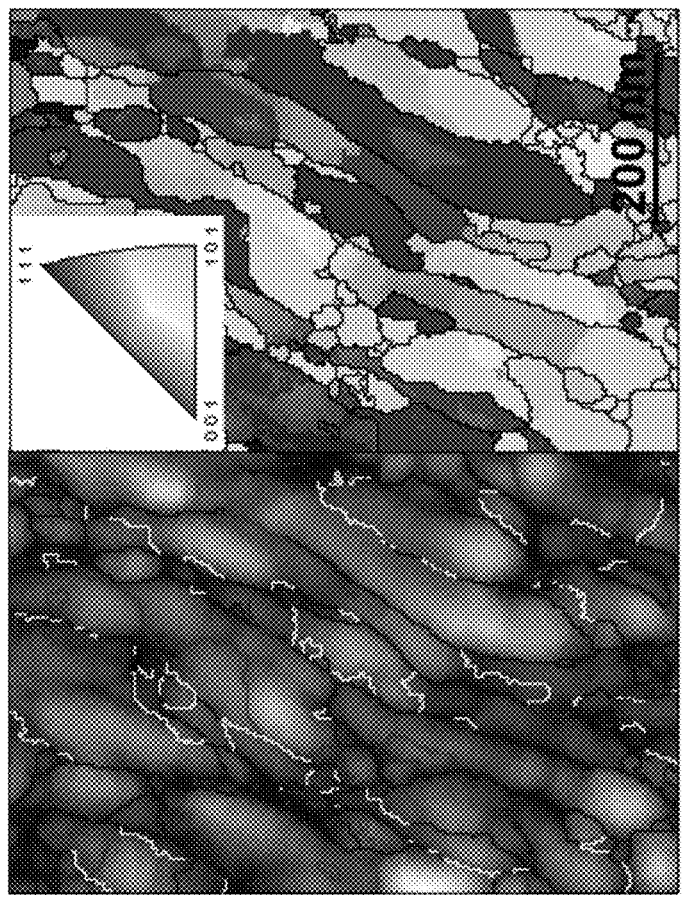
FIG. 6F shows ASTAR orientation map analysis results of lamellae of FIG. 6E.
Figure 6E:
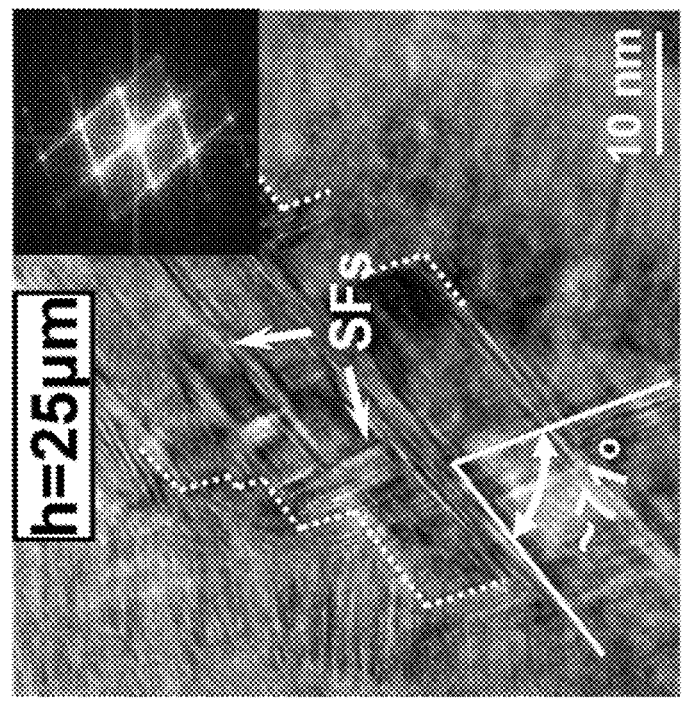

FIGS. 6A and 6B show the TEM images of NL layer in the depth of ~25 μm from treated surface. The inserted SAD pattern verifies the nanostructure of this region. Classical laminate structures with average $D_T$ of 49 nm and $D_L$ of 275 nm are observed (as FIG. 6C shows), which is just slightly finer than that close to the SB/NL interface area. However, the sub-microstructure of nano lamella is different. FIGS. 6D and 6E compare the variation of microstructure of lamella in the depth of ~35 μm and ~25 μm area. In the depth of 35 μm region, only one set of SFs/nanotwins is observed. While in the depth of ~25 μm region, in where higher strain and strain rate been imposed during SMGT process, another set of SFs/nanotwins appears. The angle between them is measured to be ~71°. It's interesting to notice that the boundaries between each lamella are zig-zagged attributed to the formation of intersected SFs/nanotwins structure, as white dotted lines indicate. The ASTAR orientation map analysis of NL layer in the depth of 25 μm are presented in FIG. 6F. The grain boundary characteristic map on the left and corresponding reverse pole figure image on the right reveals the HAGB dominated character and randomly distributed grain orientation of the region.

Figure 7B:
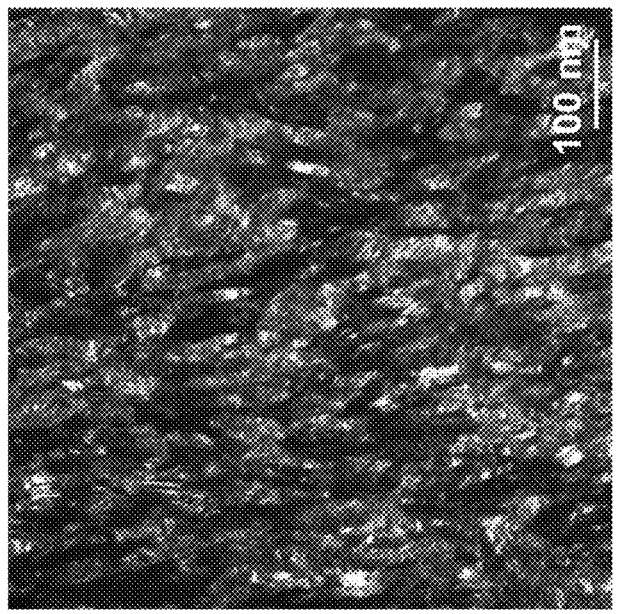
FIGS. 7A and 7B show bright and dark field TEM images respectively of the lamellae formed on the top surface layer that ~7 μm from the treated surface.
Figure 7A:
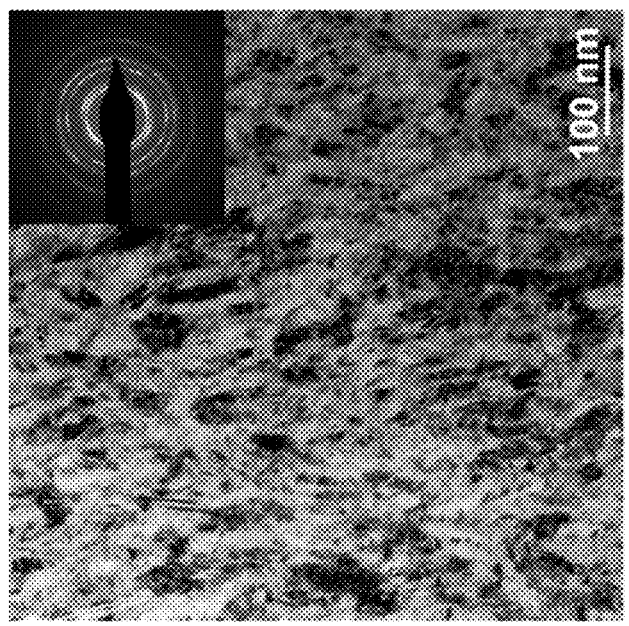
Figure 7D:
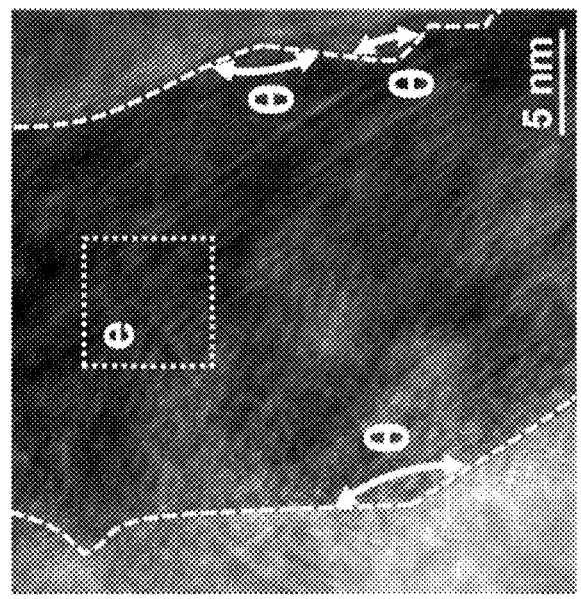
FIG. 7D shows HRTEM image of the zig-zagged grain boundaries of the nano-lamellae.
Figure 7C:
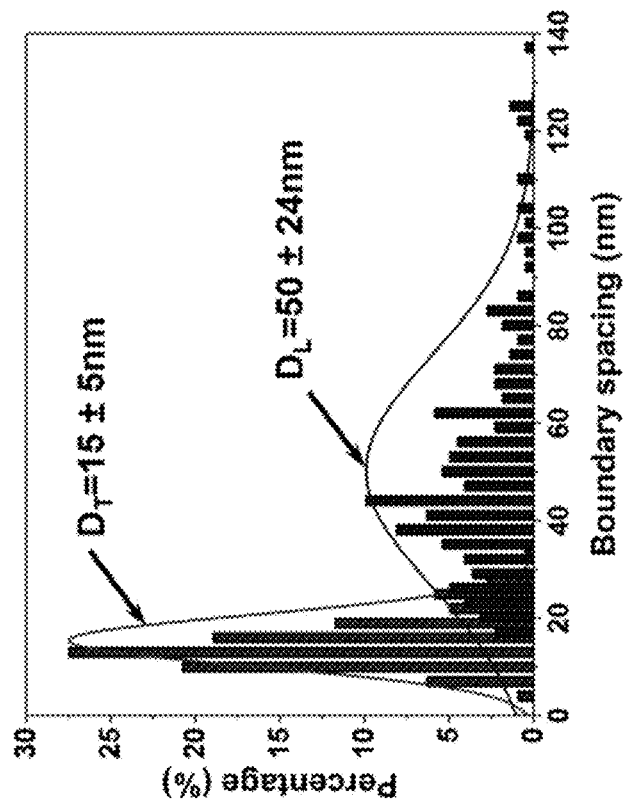
FIG. 7C shows statistical distribution of lamellae thickness ($D_T$) and length ($D_L$) at ~7 μm form the surface of the sample.
Figure 7F:
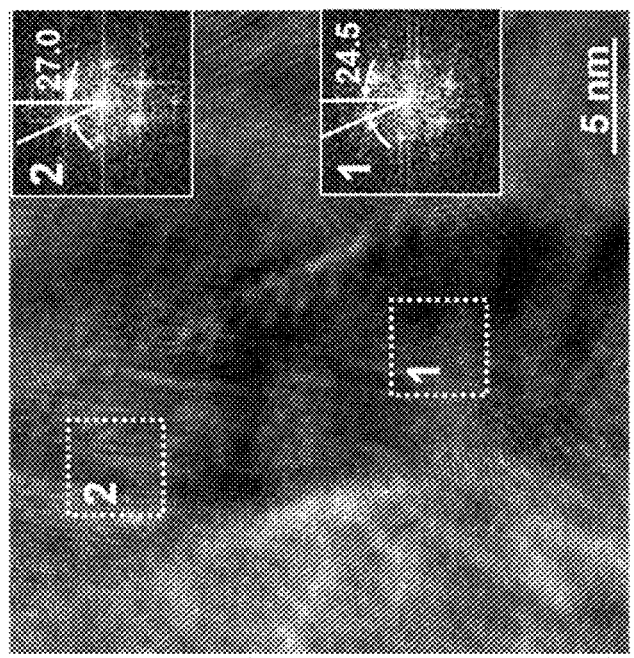
FIG. 7F shows an HRTEM image showing the lattice distortion inside a lamella in FIG. 7A.
Figure 7E:
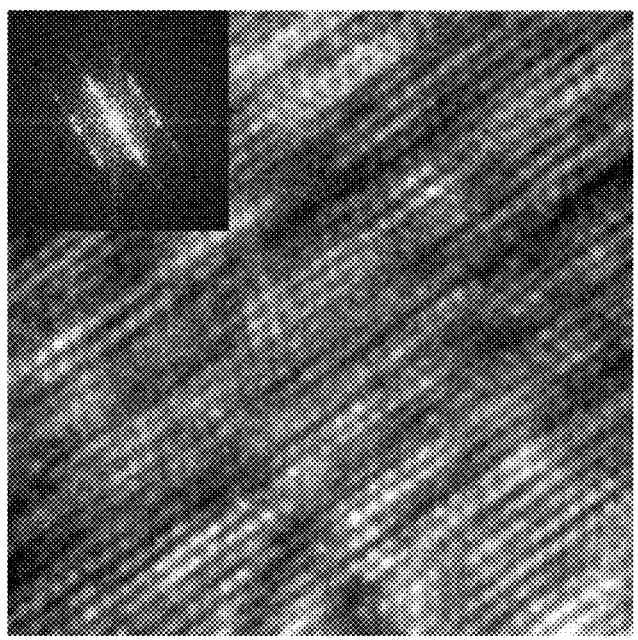
FIG. 7E shows an atomic-resolution TEM image of the dashed box e in FIG. 7D and, as insert, corresponding FFT pattern revealing high-density SFs inside the nano lamella.
Figure 7H:
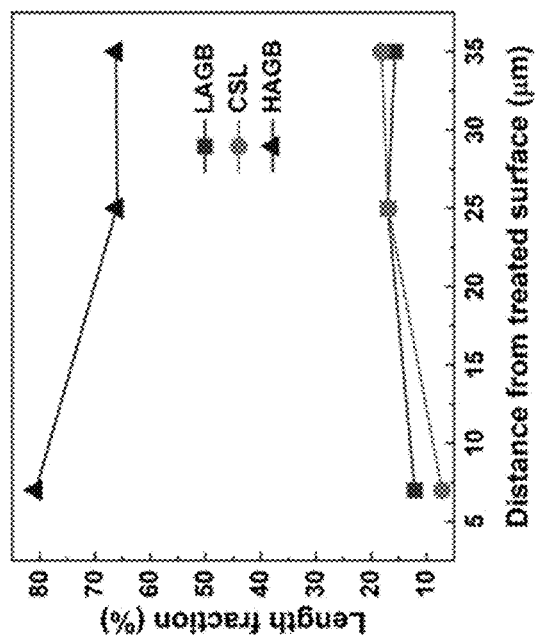
FIG. 7H shows variation of fraction of low angle grain boundary (LAGB), coincidence site lattice (CSL) boundary and high angle grain boundary (HAGB) in the NL layer as a function of distance from the treated surface.
Figure 7G:
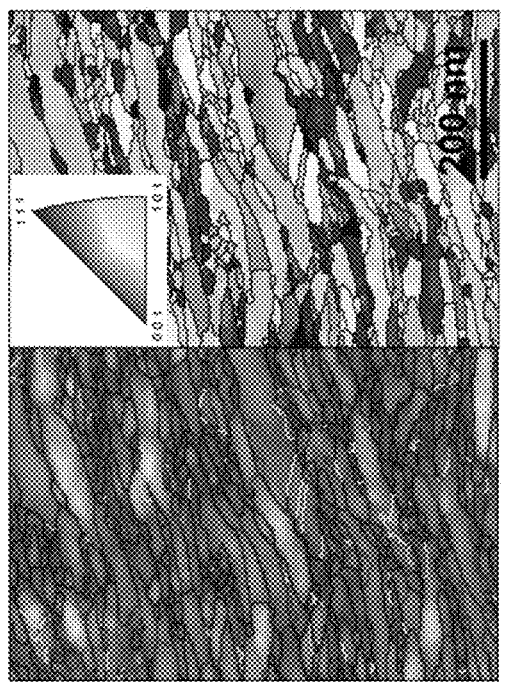
FIG. 7G shows ASTAR orientation map analysis results of FIG. 7A

In the topmost layer of ~7 μm from treated surface are finer laminated structures, as shown in FIGS. 7A and 7B. Although continuous rings were observed in the inserted SAD pattern in FIG. 7A, some preferential orientations exist with slight intensity differences in the rings, as indicated by arrows. The statistical data in FIG. 7C indicates that the laminated structure with thickness ranges from several to 30 nm (averagely 15 nm) and length spans from 20 to 140 nm (averagely 50 nm) are formed, which is much finer than that in the deeper region. Smaller aspect ratio (~3.3) are observed when comparing with that in the depth of 25 and 35 μm (>5.0), indicative of further fragmentation of nanolamellae in this region. The details of the microstructure of lamella were characterized using HRTEM. Zig-zagged grain boundaries with average intersection angle θ of ~140° are frequently observed in this region, as shown in FIG. 7D. which could have been transformed from the zig-zagged grain boundaries and intersected SFs structures in the deeper layer (as FIG. 6E shows). An atomic-resolution TEM image of the area enclosed by dashed box e in FIG. 7D and corresponding FFT pattern reveals that high density of SFs (marked by white arrows) have formed inside each lamella. FIG. 7F shows another nanolamella with high-density SFs and the corresponding FFT patterns taken from region 1 and 2 of FIG. 7F. Indexing of the patterns suggests that lattice distorted in the lamella, which indicates a high strain value. The ASTAR orientation map analysis results are shown in FIG. 7G. The grain boundary characteristic map on the left and corresponding reverse pole figure image on the right show that majority of grain boundaries are HAGB (blue lines), and grain orientation are distributed randomly. The variation of fraction of LAGB, CSL boundary and HAGB from deep region to the surface in NL layer is presented in FIG. 7H. It reveals that HAGB dominates in the entire range. In the topmost part of NL layer, almost all CSL boundaries has been transformed to HAGB and the proportion of CSL boundaries is negligible.

Figure 8B:
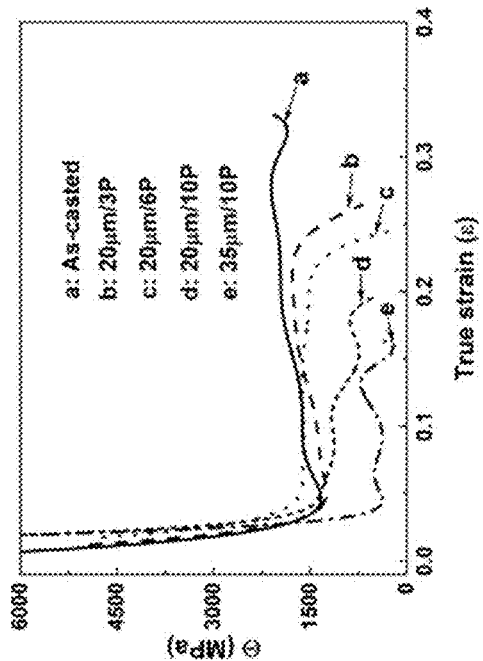
FIG. 8B shows work hardening rate (Θ) plots of samples used in generating the data in FIG. 8A.
Figure 8A:
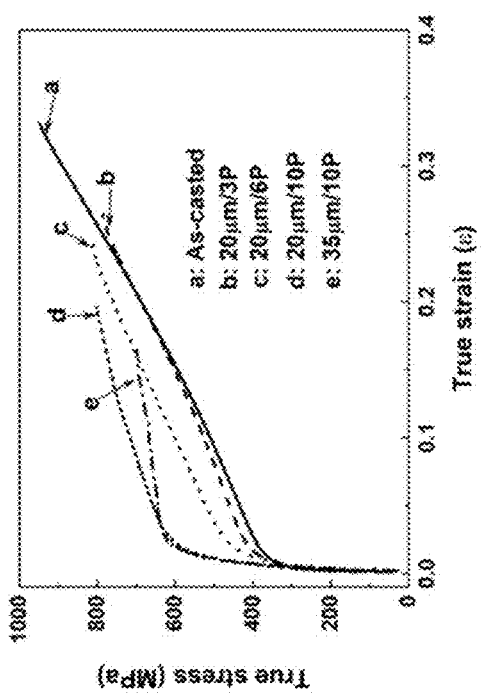
FIG. 8A shows true stress-strain curves of both as-casted and gradient samples processed using different parameters.

Mechanical testing results: FIG. 8A provides the comparison of the tensile true stress-strain curves of processed TWIP steel fabricated by various processing parameters. The as-casted specimen yielded at low stress of ~370 MPa and then exhibited a significant work hardening stage until reaches the ultimate tensile strength ($\sigma_{UTS}$) of ~920 MPa at the true uniform strain of ε=0.32. The extraordinary work hardening behavior were frequently observed in TWIP steels owing to the formation of twins during deformation, which act as sub-boundary-like obstacles to dislocation motion. After 3 and 6 passes SMGT processing with the penetration depth of 20 μm, the yield strength ($\sigma_Y$) increased slightly to ~400 and ~430 MPa, respectively, while the GUTS reduced to ~760 MPa. Concurrently, the uniform elongation decreased to ~0.25. With further increase in the number of processing passes to 10, the $\sigma_Y$ increased to ~600 MPa and, the uniform strain further deceased to ~0.20. Interestingly, increasing of penetration depth from 20 μm to 35 μm just slightly strengthened the specimen to ~608 MPa, and the uniform elongation was diminished to ~0.16. FIG. 8B shows the work hardening rate of each specimen. It reveals that the work hardening rate decreased gradually with the increasing of processing pass and penetration depth. 35 μm/10P sample exhibits lowest work hardening rate.

Figure 8C:
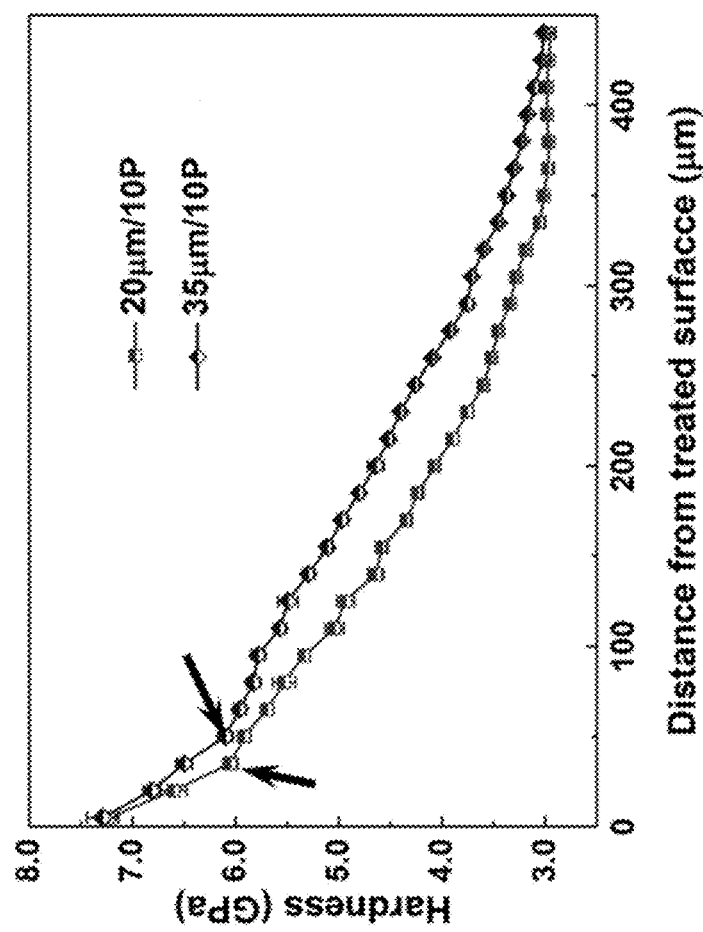
FIG. 8C shows the Vickers hardness evolution of 20 μm/10P and 35 μm/10P samples along the depth direction.

The Vickers hardness evolution of 20 μm/10P and 35 μm/10P samples along depth direction in FIG. 8C shows that, the hardness of surface NL layer of these two samples are almost identical. An obvious turning point of hardness is observed (as the black arrows indicate) between surface NL and SB layer, which is consistent with the sharp interface of microstructure evolution of these two layers (as shown in FIG. 5A). The overall deformation depth is ~350 μm and ~450 μm for 20 μm/10P and 35 μm/10P samples, respectively.

Figure 9B:
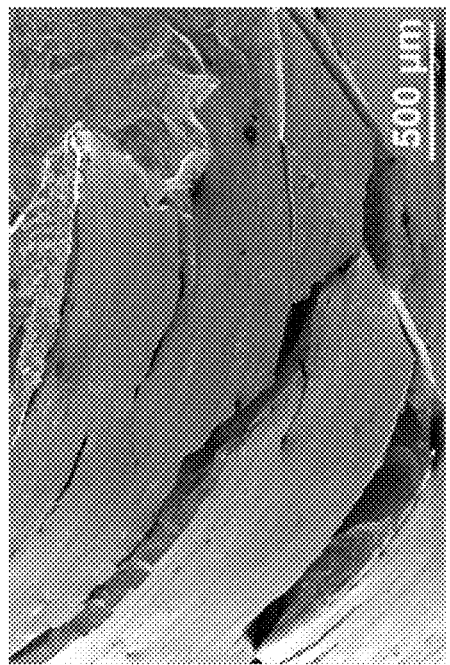
FIG. 9B shows an SEM image of the cracks formed on the surface of gauge area of 35 μm/10P specimen.
Figure 9A:
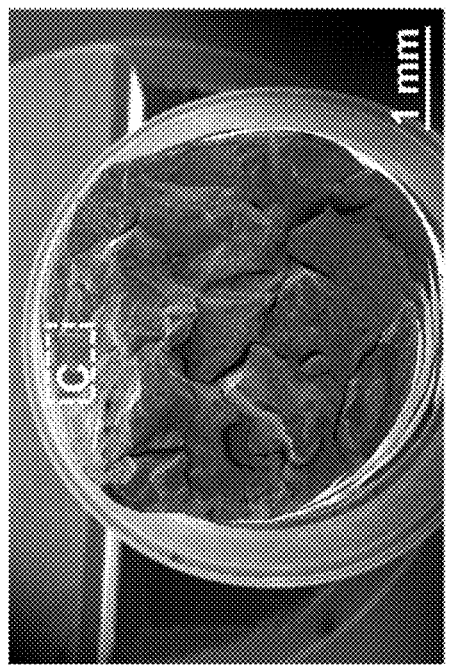
FIG. 9A shows SEM images of an over view of the fracture surface of 35 μm/10P specimen.
Figure 9D:
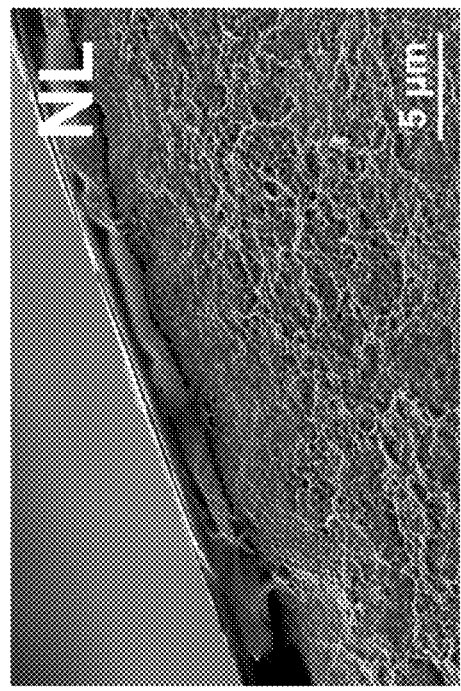
FIG. 9D shows SEM image of dimples on the fracture surface of the NL layer of 35 μm/10P specimen.
Figure 9C:
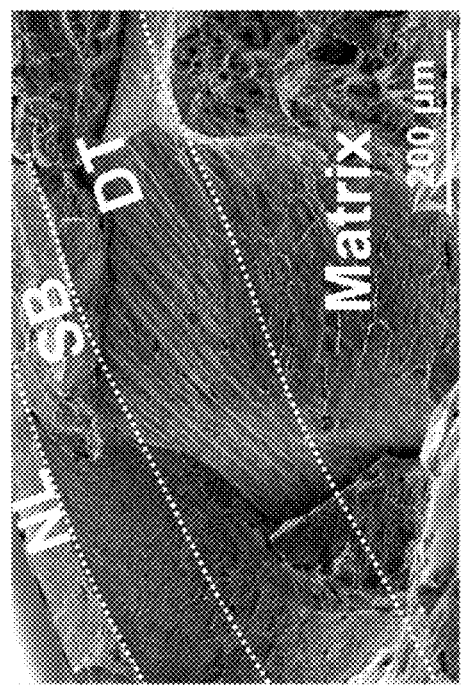
FIG. 9C shows SEM image of the fracture surface of processed layers revealing the sharp interface between surface NL and SB layer of 35 μm/10P specimen.
Figure 9F:
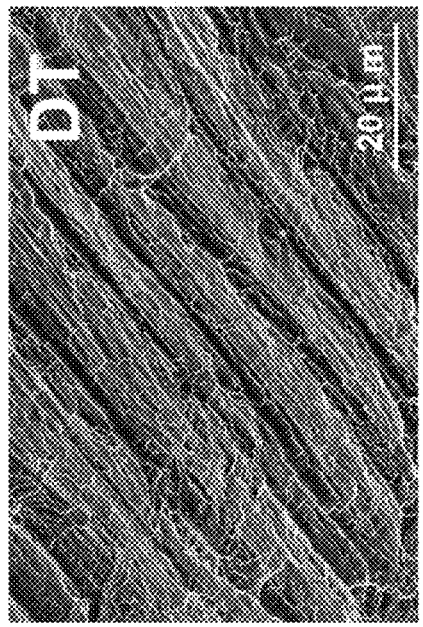
FIGS. 9E and 9F show SEM images of the fracture surfaces of SB and DT layers respectively of 35 μm/10P specimen.
Figure 9E:
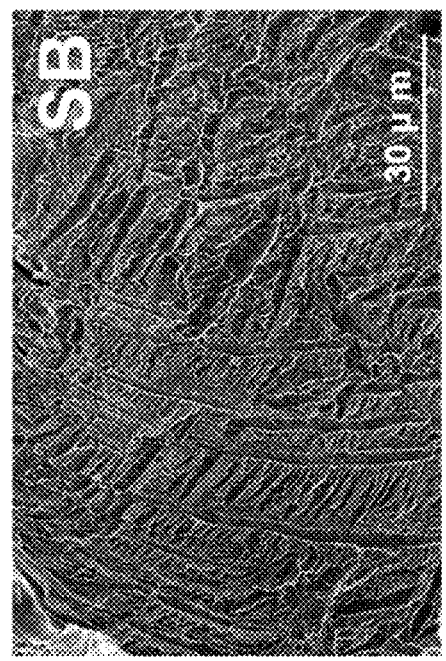
Figure 9G:
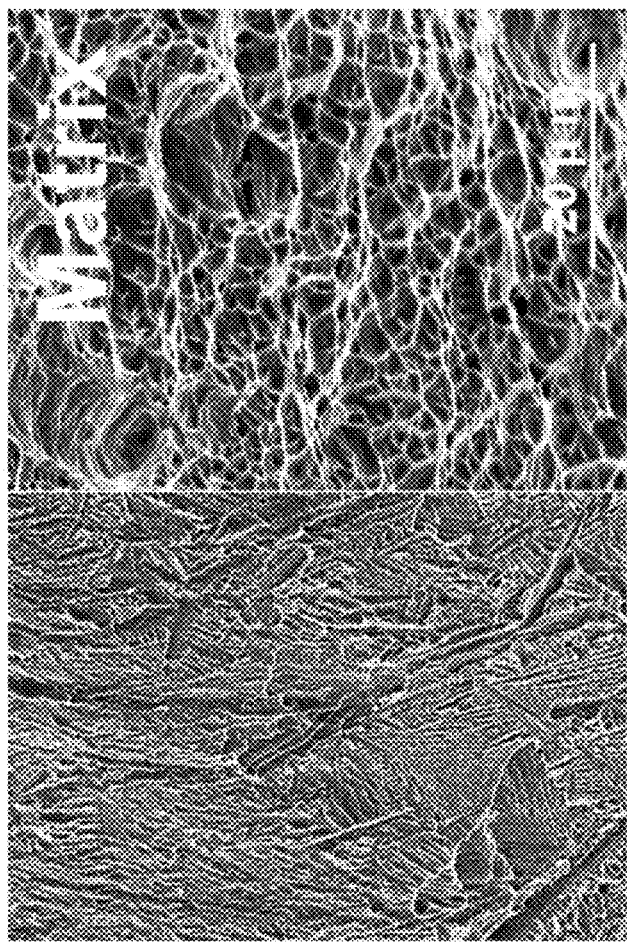
FIG. 9G shows SEM images of the fracture surfaces matrix region of 35 μm/10P specimen.

SEM micrographs in FIGS. 9A through 9G show the fracture surface of 35 μm/10P specimen after tensile tests. The overview of fracture surface in FIG. 9A shows a mixture of intergranular and intragranular fracture model. Cracks along the boundary of giant grains are observed. SEM image in FIG. 9B shows the cracks formed on the surface of gauge length under tension. These cracks formed on the hard surface NL layer may have penetrated through the gauge area and lead to the final failure of the sample. A detailed observation of the fracture surface of gradient structure of the area c in FIG. 9A is shown in FIG. 9C. It reveals that there is a sharp interface appears between surface NL and SB layer, which is consistent with the discontinuity of microstructure and Vickers hardness evolution (in FIG. 5A and FIG. 8C). Even though the fracture surface of NL layer is smooth in the low magnification in FIG. 9C, dimple-like morphology is observed under higher magnification (as shown in FIG. 9D), implying that the failure mode was primarily ductile rupture. However, the dimple feature disappears immediately after across the NL/SB interface. The fracture feature in SB and DT layer in FIGS. 9E and 9F have similar character with original microstructure of them, i.e. shear band and DT in the SB layer, and primary DT structure in DT layer. The fracture surface of matrix area in FIG. 9G shows mixture of brittle fracture (left) and ductile dimple fracture (right).

Microstructure evolution: Grain refinement of bulk metallic materials through severe plastic deformation has been extensively studied. For materials with medium to high SFE, dislocation subdivision is the main grain refinement mechanism. For metals with low SFE, deformation twinning generally plays the dominate role. In literature, twinning take place when the SFE of metal in the range of 18-45 mJ/m². The grain refinement process of TWIP steel during SMGT in this study can be described into 4 steps, as illustrated schematically in FIG. 10. In the DT layer, primary DTs with average thickness of ~10 nm formed throughout all coarse grains, as illustrated in stage 1 of FIG. 10. The formation of DTs subdivided the original grain into lamellae. But the undeformed matrix area still dominated at this stage, which can be verified by the comparison of the thickness of DT and matrix in FIG. 2F. Besides, high-density inclined SFs were activated along another (111) plane. The formation of secondary SFs was reported to be formed by partial dislocation emission from primary twin boundaries.

Figure 10:
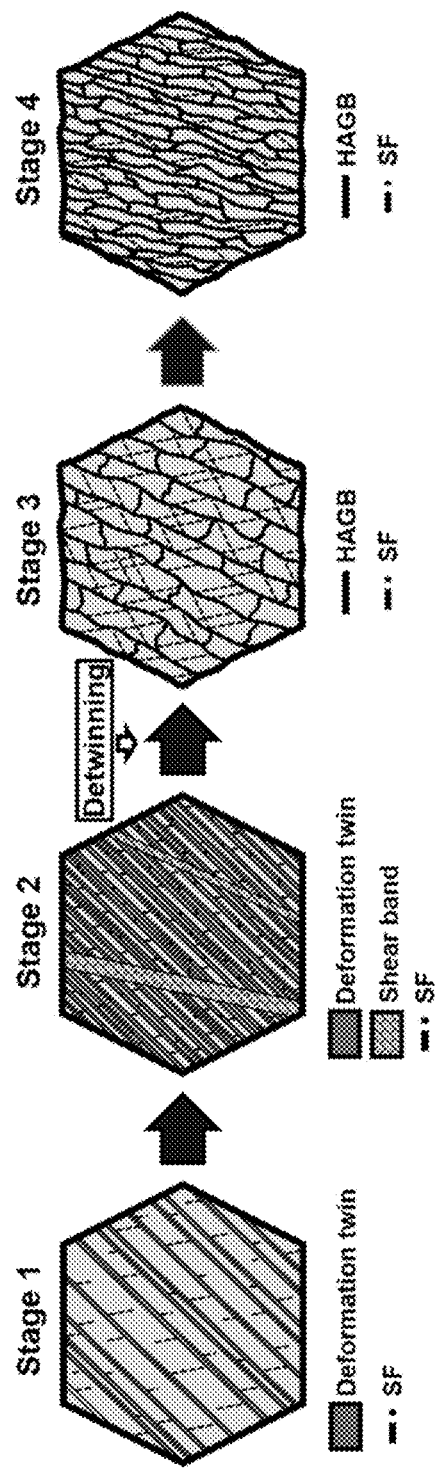
FIG. 10 is a schematic representation of the microstructure evolution of each individual layer of processed TWIP steel showing formation of DT layer, SB layer, deeper NL layer and topmost NL layer.

With the increasing of both strain and strain rate, the DT density increased, or the twin spacing decreased significantly in the SB layer, as shown in Stage 2 of FIG. 10. Practically, the entire grain has been transformed to twin structure as the thickness of DT and matrix was measured to be similar (12 vs 14 nm in FIG. 3F). Another phenomenon to be noted is that, the secondary SFs ribbons formed in the DT layer didn't grew into secondary twinning system. One possible reason lies in that the energy needed for secondary twinning system to overcome the barrier of the primary DTs is too high compared with that in metals with lower SFE, in which cases twin-twin intersections are the prominent features. Another reason is that the inclined SFs were found to interact with primary twin boundary and result in detwinning, which will be discussed in detail in the following section. To accommodate the high shear strain, localized deformation takes place in the form of SBs. Within each SB, the original twin boundaries were severely twisted under shear strain and resulted in the formation of randomly oriented nanograins, as FIG. 3E shows. Similar structures have also been reported in GS C-22HS nickel-based alloys processed by SMGT and dynamic plastically deformed copper.

When shear strain increased beyond a critical value, the remaining primary twin boundaries after detwinning transformed into HAGBs via dislocation-twin boundary interaction, forming nanolaminated structures in the surface NL layer, as illustrated in Stage 3 of FIG. 10. This process is accompanied by the formation of high-density SFs/nanotwins in the new formed nanolamellae, as evidenced by FIG. 6D. These nanotwins decorated by SFs were also frequently observed in other nanostructured low SFE metals processed by severe plastic deformation. The difference between the approaches of this disclosure and previous studies is that, the highly twined structure of previous studies went through detwinning immediately via partial dislocation emission from twin boundaries and grain boundaries. However, in this disclosure, another SFs/nanotwin system was activated with increasing strain first before detwinning, as shown in FIG. 6E. With further increasing of strain in the topmost layer during SMGT, the significant dislocation-twin boundary interaction enabled the transformation of twin boundaries into HAGBs and consequently further subdivided the nanolamellae, as illustrated in Stage 4 of FIG. 10. The zig-zagged character of two sets of twinning systems were sustained after the transformation, as shown in FIG. 7D.

Twinning in coarse grain and nanolamellae: Deformation twinning in coarse grain is different with that in grains with nano scale. Several mechanisms have been proposed for the interpretation of twinning in coarse grained face centered cubic metals, including the pole mechanism, prismatic glide mechanism and faulted dipole mechanism etc. The operation of these mechanisms usually requires a dislocation source. According to experimental results, deformation twinning in smaller grains is more difficult than in large grains. In this disclosure, high density of DTs with average twin spacing of 10-12 nm were formed in coarse grains, as shown in FIG. 2A. In this disclosure, only one primary twinning system was activated during SMGT, which is determined by the SFE of TWIP steel. For metals with lower SFE, for instance 304 and 301LN stainless steel, secondary twinning systems are activated under shear stress and the interaction of primary and secondary twins subdivided the coarse grain into rhombic blocks.

When the grain size is refined down to nanometer range, the conventional dislocation source that operates in coarse grains (like the Frank-Reed source) may no longer work, which results in the depletion of dislocations in nanograins. Hence, the deformation twinning mechanisms of coarse-grained metals will not operate in nanostructured materials. However, deformation twining has been frequently reported in nanocrystalline metals even with medium to high SFE, which means that twinning is one of the major deformation mechanisms for nanocrystalline materials. It was reported that DTs in nanocrystalline metals formed through SFs emission from grain boundaries rather than pole mechanism. With decreasing grain size, the twinning propensity first increases and then decreases after beyond a critical grain size (~25 nm for nanocrystalline Ni), which refers to the inverse grain-size effect. While the SF propensity increases monotonically with decreasing grain size. In this study, high density of SFs/nanotwins along a prevailing direction formed in deeper region of NL layer (as shown in FIG. 6D). With decreasing of grain size and increasing of strain and strain rate, as evidenced in FIG. 6E, the secondary SFs/nanotwins system activated, which is contributing to the higher SFs and twinning propensity of this region. Similar structures have been observed in ultra-fine-grained austenite grains processed by high pressure torsion. While only one set of SFs/nanotwins system has been activated in their case as the grain size was much larger (~200 nm). When the nanolamellae was further refined to ~15 nm in topmost surface layer, only high-density SFs were observed (as shown in FIG. 7E) and nanotwins were rarely seen, which may contribute to the inverse grain-size effect of twinning in finer grain size range.

Detwinning process occurred in SB layer during SMGT increased the thickness of primary DTs from ~12 nm (in FIG. 3F) to over 35 nm (in FIG. 4C), which is believed to be taken place via the interaction of inclined SFs/nanotwins along another {111} plane and the primary twin boundaries. When the secondary SFs/nanotwins that formed by partial dislocation emit from twin boundaries glided and reached the other end of twin lamella, the partial dislocations associated with it interacted with the twin boundary. Under a certain applied stress, the following dislocation reaction occurs according to Thompson tetrahedron:

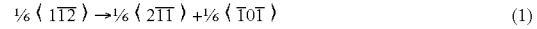

(1)

where $\tfrac{1}{6}\langle 1\bar{1}2\rangle$ is the Burgers vector of the 30° inclined Shockley partial, $\tfrac{1}{6}\langle 2\bar{1}\bar{1}\rangle$ is that of the new Shockley partial formed in the twin boundary plane, and $\tfrac{1}{6}\langle \bar{1}0\bar{1}\rangle$ is that of the stair-rod dislocation. The glide of $\tfrac{1}{6}\langle 2\bar{1}\bar{1}\rangle$ along twin boundary will move the boundary toward the interior of twin by one atomic plane, and leaves a step (as identified by FIGS. 4A and 4B) and a stair-rod dislocation in the boundary. The stair-rod dislocation $\tfrac{1}{6}\langle \bar{1}0\bar{1}\rangle$ could be further dissociated under appropriate applied stress through the reaction:

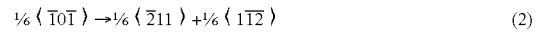

(2)

where $\tfrac{1}{6}\langle \bar{2}11\rangle$ is the Burgers vector of another Shockley partial that in the twin boundary plane, which has opposite sign with the first one. Consequently, the new born Shockley partial will glide along the opposite direction of twin boundary and move the rest part of twin boundary toward the twin interior. The results of dislocation reaction (1) and (2), and the gliding of two Shockley partials are that, the whole twin boundary moves toward the twin interior by one atomic plane and leaves an identical partial with Burgers vector of $\tfrac{1}{6}\langle 1\bar{1}2\rangle$ that 30° inclined to the twin boundary. The repeating of above process will eventually annihilate the whole twin structure.

The mechanical properties of processed TWIP steel fabricated by various processing parameters were investigated by performing tensile tests. It reveals that the yield strength increases with the increasing of processing passes. The deformation mechanism of GS metals has been studied elsewhere. Under tension stress, the soft inner core of GS metal yields firstly, while the hard surface core still deforms elastically. The mechanical incompatibility of different layers of gradient structure caused by the difference of Poisson's ratio in the elastic outer hard layer and central plastic soft core, and the stress gradient along the depth direction produced during tension contributed to the synergetic strengthening effect, which increase the strength of plastically deforming layer. The yielding of GS metals occurs when the hard surface layer yields, which means that the yield strength of GS materials is mainly determined by the strength of outmost hard surface. Previous study about the tensile properties of GS interstitial free (IF) steel fabricated by SMAT technique shows that the yield strength decreased gradually with thicker hard surface layer be removed. In this study, the hardness of surface layer may increase gradually with increasing processing pass and reached a maximum value after 10 passes as the grain refinement may have reached the equilibrium states (lamellae thickness has been refined to 15 nm in the surface layer, as shown in FIG. 7C), which resulted in an increased yield strength with more processing pass. The equilibrium states of grain refinement process have also been reported in other nanocrystalline metals fabricated by severe plastic deformation. While the hardness of surface layer of 20 μm/10P and 35 μm/10P sample were measured to be almost identical (~7.2 GPa, as evidenced in FIG. 8C). Consequently, the yield tensile strength of these two specimens are also similar (in FIG. 8A).

Another interesting phenomenon is that the working hardening rate decreased with increasing of processing passes and penetration depth. The work hardening mechanisms of GS materials have been studied by researchers before. One of mechanisms claims that the back stress strain hardening that derived from the generation of GND during deformation have contributed to the good ductility. In GS materials, strain will be inhomogeneous but continuous during tension due to the mechanical incompatibility, which leads to strain gradient. GND is required to maintain the crystal continuity and accommodate strain gradient. The density of GND ($\rho_{GND}$) is proportional to the strain gradient in the form of: $\rho_{GND}=4\gamma/(b\lambda)$, where $\gamma$ is the macroscopic plastic shear strain gradient, b is the Burgers vector and $\lambda$ is the length scale of deformation zone, which corresponding to the thickness of deformation zone. In this study, the deformation depth increased with both processing pass and penetration depth. As shown in FIG. 8C, the deformation zone of 20 μm/10P and 35 μm/10P specimens are 350 μm and 450 μm, respectively. While strain gradient of 20 μm/10P sample is higher than that of 35 μm/10P one, especially in the surface NL layer, which can be verified by the hardness vs depth plot in FIG. 8C. The combination of higher strain gradient and thinner deformation depth of 20 μm/10P sample resulted in higher density of GND, and consequently exhibits higher work hardening rate than the 35 μm/10P one. Previous studies also confirmed that the ductility decreased with the increasing of volume fraction of GS. Hence, an optimum GS may exist for the best strength-ductility combination, which worthwhile for further investigation by varying processing parameters.

Thus, based on the above descriptions, gradient structure has been introduced into the surface of TWIP steel using SMGT technique. Microstructure evolution of each individual layer of gradient structure was investigated in details and the tensile behavior was studied by dog-bone specimens. The following conclusions are drawn: 1) The gradient structure containing surface NL layer, SB layer and DT layer formed on the surface after SMGT. There is a sharp interface between NL and SB layer; 2) Detwinning takes place in the SB layer during SMGT, which is attributed to the interaction of inclined SFs with primary twin boundaries; 3) High density of SFs/nanotwins formed in the surface NL layer, which subdivided the nanolamellae further into smaller one; 4) The yield strength of processed TWIP steel increases with processing pass and reaches a plateau when the surface layer doesn't strengthen further; 5) Work hardening rate decreases with increasing of processing pass and penetration depth. An optimum gradient structure may exist for the best strength-ductility combination.

Several industrial applications can use the process and structures described in this disclosure to enhance the mechanical strength of metallic materials for structural and engineering applications, where high strength or increase in strengths from a current state is required or desired. Non-limiting examples include components made for automotive applications such as, but not limited to, automotive body parts.

It should be recognized that the SMGT process is applicable to many metallic materials, besides TWIP steel. For example, in experiments leading to this disclosure, nickel alloys such as Ni—Cr—Mo-based C22 HS alloys were subjected to SMGT process resulting increased compression strength and surface layers similar to the NL. SB and DT layers described above. In these alloy samples, a gradient microstructure containing surface nanolaminated layer, deformation twinned layer and severely deformed layers was achieved. In situ micropillar compression tests performed inside a scanning electron microscope revealed different mechanical behaviors of each layer. The results of the experiments suggested that the increase of intergranular back stress may have contributed to the high strain hardening behavior of the gradient material.

Gradient structures have been introduced into C-22HS nickel-based alloy by SMGT technique. The microstructure of gradient structured C-22HS samples evolves from NL to DT layers and subsequent SD layers adjacent to the unaffected matrix. In situ micropillar compression tests coupled with microscopy studies showed that: 1) The strength of NL and DT layers is significantly greater than that of the unaffected matrix; 2) The NL layer has a two-stage work hardening behavior, and the first stage has a large work hardening exponent; 3) Back stresses develop in NL and DT layers during deformation due to the existence of GNDs. and 4) The lamella structure of the NL layer is stable during compression, with little grain coarsening.

Based on the above description, it is an objective of this disclosure to describe a method of strengthening a component made of a metallic material. The method includes subjecting a component made of a metallic material to a mechanical grinding process incorporating a relative motion between a tool made of a material having hardness that is greater than that of the metallic material, and the component made of a metallic material, wherein a gradient structure formed on the surface of the component made of the metallic material, resulting in a tensile strength of the component made of the metallic component greater than the tensile strength the component made of the metallic component prior to being subjected to the mechanical girding process. The tool is typically spherical in shape. Its size can be varied suitably depending on the size of the component. Larger components will of course larger tools. As described in this disclosure, a 7 mm rod (an example of a component) was subjected to this method using a tool in the form of sphere with a diameter of 6 mm. Variations form these are possible and can be determined by hose skilled in the art. Other shapes for the tool are possible. The spherical shape of the tool with the rod provides an approximate "point" contact and is useful in controlling the depth of grinding along a dimension of the component. It should be recognized that, in practice, the components may be of regular shape or irregular shape. Depending on the shape of the component and its complexity, the grinding set up has to be adjusted or configured. In some situations the relative motion in the method can be induced by moving the component, whereas in some other situations, especially when the shape of the component is highly irregular, the too may have to be moved relative to the component. In some embodiments of the method, a non-limiting range for tensile strength of the component after the mechanical grinding process is in the range of 350 MPa to 600 Mpa. In one embodiment of the method, the tool is made of tungsten carbide. The requirement for the tool is that it should have higher hardness than that of the component. In some embodiments of the method employing a tool made of tungsten carbide (WC), a non-limiting range for tensile strength of the component after the mechanical grinding process is in the range of 350 MPa to 600 Mpa.

It is another objective of this disclosure to describe a method of strengthening a component made of a TWIP steel.

The method includes subjecting a component made of TWIP steel to a mechanical grinding process incorporating a relative motion between a tool made of a material having hardness that is greater than that of TWIP steel, and the component made of TWIP steel, wherein a gradient structure formed, said gradient structure containing a surface nanolaminate layer, a shear band layer, and an inner deformation twinned layer, such that the component made of TWIP steel possesses a tensile strength greater than the tensile strength the component of made of TWIP steel prior to being subjected to the mechanical girding process. In some embodiments of the tool is made of tungsten carbide (WC). In some embodiments of the method, the tungsten carbide tool is spherical in shape. Its size can be varied suitably depending on the size of the component. Larger components will of course larger tools. As described in this disclosure, a 7 mm rod (an example of a component) was subjected to this method using a tool in the form of sphere with a diameter of 6 mmm. Other materials suitable for the tool include, but not limited to, silicon carbide (SiC), diamond, silicon nitride (SiN), Aluminum nitride (AlN) and alumina ($Al_2O_3$). Those skilled in the art will readily recognize other choices, the requirement for the tool being that its hardness be higher than that of the component being subjected to the grinding process. In some embodiments of the method, a non-limiting range for tensile strength of the component after the mechanical grinding process is in the range of 350 MPa to 600 Mpa. In some embodiments of the method employing a tool made of tungsten carbide (WC), a non-limiting range for tensile strength of the component after the mechanical grinding process is in the range of 350 MPa to 600 Mpa. In some embodiments of the method, an additional grinding step to smoothen the surface subjected to the SMGT process can be performed. This step will reduce eliminate surface cracks resulting in the component possessing a ductility higher than that possessed by the component prior to the additional grinding step or operation.

It is another objective of this disclosure to describe a component made of a TWIP steel comprising gradient structure containing a surface nanolaminate layer, a shear band layer, and a deformation twinned layer. In some embodiments of this component, the component has a tensile strength is in the range of 350 MPa to 600 Mpa. In some embodiments of the component, the surface nanolaminate layer has gradient structure wherein the grain size varies from 10 nm to 100 nm. In some embodiments of the component of this disclosure, the surface nanolaminate layer has gradient structure wherein the grain size varies from 15 nm to 60 nm. In some embodiments of the component of this disclosure, the shear band layer has a twin spacing in the range of 10 nm to 80 nm. In some embodiments of this disclosure, the shear band layer contains deformation twins. In some embodiments of the component of this disclosure, containing deformation twins the deformation twins have a twin spacing in the range of 10 nm to 80 nm. In some embodiments of the component of this disclosure, the deformation twinned layer has a twin spacing in the range of 10 nm to 100 micrometers. In some embodiments of the component of this disclosure, the deformation twinned layer has a twin spacing in the range of 10 nm to 10 micrometers.

While the present disclosure has been described with reference to certain embodiments, it will be apparent to those of ordinary skill in the art that other embodiments and implementations are possible that are within the scope of the present disclosure without departing from the spirit and scope of the present disclosure. Thus, the implementations should not be limited to the particular limitations described. Other implementations may be possible. It is therefore intended that the foregoing detailed description be regarded as illustrative rather than limiting. Thus, this disclosure is limited only by the following claims.

The invention claimed is:

1. A method of strengthening a component made of a metallic material, the method comprising:
subjecting a component made of steel to a mechanical grinding process incorporating a relative motion between a tool made of tungsten carbide (WC) and the component made of steel, wherein a gradient structure formed on the surface of the component made of steel, resulting in a tensile strength of the component made of steel greater than the tensile strength the component made of steel prior to being subjected to the mechanical girding process.

2. The method of claim 1, where in the tensile strength of the component after the mechanical grinding process is in the range of 350 MPa to 600 Mpa.

3. A method of strengthening a component made of a TWIP steel, the method comprising:
subjecting a component made of TWIP steel to a mechanical grinding process incorporating a relative motion between a tool made of a material having hardness that is greater than that of TWIP steel, and the component made of TWIP steel, wherein a gradient structure is formed, said gradient structure containing a surface nanolaminate layer, a shear band layer, and an inner deformation twinned layer, such that the component made of TWIP steel possesses a tensile strength greater than the tensile strength the component of made of TWIP steel prior to being subjected to the mechanical girding process.

4. The method of claim 3, wherein the tool is made of tungsten carbide (WC).

5. The method of claim 4, wherein the tool made of tungsten carbide is spherical.

6. The method of claim 3, where in the tensile strength of the component after the mechanical grinding process is in the range of 350 MPa to 600 Mpa.

7. The method of claim 4, where in the tensile strength of the component after the mechanical grinding process is in the range of 350 MPa to 600 Mpa.

8. The method of claim 3, further comprising the step of reducing or eliminating surface cracks by an additional grinding operation, wherein the resulting component has a ductility higher than that possessed by the component prior to the additional grinding operation.

* * * * *